United States Patent
Hearty et al.

(10) Patent No.: US 12,355,800 B2
(45) Date of Patent: Jul. 8, 2025

(54) TRUST SCORING SERVICE FOR FRAUD PREVENTION SYSTEMS

(71) Applicant: MASTERCARD TECHNOLOGIES CANADA ULC, Vancouver (CA)

(72) Inventors: John Hearty, Vancouver (CA); Parin Prashant Shah, Burnaby (CA); Jake Madison, Vancouver (CA); Sik Suen Chan, Richmond (CA); Bingjing Yu, Richmond (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 110 days.

(21) Appl. No.: 17/877,160

(22) Filed: Jul. 29, 2022

(65) Prior Publication Data
US 2023/0030124 A1   Feb. 2, 2023

Related U.S. Application Data

(60) Provisional application No. 63/227,648, filed on Jul. 30, 2021.

(51) Int. Cl.
*H04L 9/40* (2022.01)

(52) U.S. Cl.
CPC ........ *H04L 63/1433* (2013.01); *H04L 63/105* (2013.01); *H04L 63/1425* (2013.01)

(58) Field of Classification Search
CPC ....................... H04L 63/1433; H04L 63/1425; H04L 63/105
See application file for complete search history.

(56) References Cited

U.S. PATENT DOCUMENTS

| | | | |
|---|---|---|---|
| 8,056,128 B1 * | 11/2011 | Dingle | G06F 16/35 726/22 |
| 8,869,245 B2 * | 10/2014 | Ranganathan | G06F 21/33 455/12.1 |
| 9,319,419 B2 * | 4/2016 | Sprague | H04L 63/06 |

(Continued)

FOREIGN PATENT DOCUMENTS

CN   111405634 A   7/2020

OTHER PUBLICATIONS

International Search Report and Written Opinion for Related Application No. PCT/CA2022/051161 dated Oct. 17, 2022 (12 pages).

(Continued)

*Primary Examiner* — Jimmy H Tran
(74) *Attorney, Agent, or Firm* — Michael Best & Friedrich LLP

(57) ABSTRACT

A fraud prevention system that includes a client server and a fraud prevention server. The fraud prevention server includes an electronic processor and a memory. The memory including a trust scoring service. When executing the trust scoring service, the electronic processor is configured to receive a trust score request of a device from the client server, generate, with a trust model, a trust score of the device, and responsive to generating the trust score, output the trust score to the client server in satisfaction of the trust score request, wherein the trust score is distinct from a risk factor, the trust score representing a predicted trust level of the device, and the risk factor representing a fraud risk level associated with the device based on one or more device behaviors.

17 Claims, 21 Drawing Sheets

(56) References Cited

U.S. PATENT DOCUMENTS

| | | | | |
|---|---|---|---|---|
| 10,218,726 | B2* | 2/2019 | Vasseur | H04L 67/303 |
| 11,177,937 | B1* | 11/2021 | McCown | H04L 9/50 |
| 11,552,953 | B1* | 1/2023 | Avadhanam | H04L 63/102 |
| 11,792,176 | B1* | 10/2023 | Lester | G06F 21/552 |
| | | | | 726/5 |
| 11,868,039 | B1* | 1/2024 | Shahidzadeh | G03F 7/70441 |
| 12,010,117 | B1* | 6/2024 | Schuster | H04L 63/0876 |
| 2006/0230039 | A1* | 10/2006 | Shull | H04L 63/08 |
| 2008/0082662 | A1* | 4/2008 | Dandliker | H04L 63/10 |
| | | | | 709/225 |
| 2012/0030083 | A1* | 2/2012 | Newman | G06Q 40/00 |
| | | | | 705/35 |
| 2012/0233665 | A1* | 9/2012 | Ranganathan | G06F 21/51 |
| | | | | 726/4 |
| 2013/0042298 | A1* | 2/2013 | Plaza Fonseca | H04L 67/535 |
| | | | | 726/1 |
| 2013/0227712 | A1* | 8/2013 | Salem | G06F 21/6218 |
| | | | | 726/30 |
| 2013/0298192 | A1* | 11/2013 | Kumar | H04L 63/1425 |
| | | | | 726/25 |
| 2014/0164178 | A1* | 6/2014 | Adjaoute | G06Q 30/0609 |
| | | | | 705/26.35 |
| 2014/0258305 | A1* | 9/2014 | Kapadia | H04W 4/21 |
| | | | | 707/741 |
| 2015/0089568 | A1* | 3/2015 | Sprague | H04L 63/0853 |
| | | | | 726/1 |
| 2015/0128236 | A1* | 5/2015 | Moscicki | G06F 21/31 |
| | | | | 726/7 |
| 2015/0188926 | A1* | 7/2015 | Hom | H04L 63/20 |
| | | | | 726/1 |
| 2015/0381540 | A1* | 12/2015 | Sargent | G06Q 10/10 |
| | | | | 709/206 |
| 2016/0086366 | A1* | 3/2016 | Crutchfield, Jr. | G06T 13/205 |
| | | | | 345/473 |
| 2016/0381056 | A1* | 12/2016 | Floering | H04L 63/1483 |
| | | | | 726/23 |
| 2017/0249698 | A1* | 8/2017 | Chan | G06Q 40/03 |
| 2017/0293873 | A1* | 10/2017 | Chrapko | G06Q 40/03 |
| 2018/0096260 | A1* | 4/2018 | Zimmer | G06N 5/025 |
| 2018/0122004 | A1* | 5/2018 | Stewart | G06Q 40/02 |
| 2018/0219891 | A1* | 8/2018 | Jain | H04L 63/1425 |
| 2018/0314701 | A1* | 11/2018 | Trudel | G06Q 10/0639 |
| 2018/0359280 | A1* | 12/2018 | Elworthy | H04L 63/1416 |
| 2019/0197443 | A1* | 6/2019 | Anderson | G06F 21/31 |
| 2019/0197461 | A1* | 6/2019 | Anderson | G09B 7/02 |
| 2019/0334940 | A1* | 10/2019 | Bar Noy | G06F 16/2379 |
| 2019/0387005 | A1* | 12/2019 | Zawoad | H04L 61/4511 |
| 2020/0005168 | A1* | 1/2020 | Bhargava | G06F 18/22 |
| 2020/0027089 | A1* | 1/2020 | Kuchar | H04L 9/50 |
| 2020/0137097 | A1 | 4/2020 | Zimmermann et al. | |
| 2020/0279183 | A1* | 9/2020 | Chrapko | G06N 7/01 |
| 2020/0293374 | A1* | 9/2020 | Phuke | G06Q 10/06311 |
| 2020/0349430 | A1* | 11/2020 | Schmidtler | G06N 3/084 |
| 2020/0380172 | A1* | 12/2020 | Parpani | H04L 63/1441 |
| 2021/0038979 | A1* | 2/2021 | Bleasdale-Shepherd | |
| | | | | G06N 3/08 |
| 2021/0297442 | A1* | 9/2021 | Vasseur | H04L 63/1441 |
| 2022/0167174 | A1* | 5/2022 | Oh | H04W 4/70 |
| 2022/0286300 | A1* | 9/2022 | Draper | H04N 21/835 |
| 2022/0383373 | A1* | 12/2022 | Dolev | G06Q 30/0609 |
| 2023/0177515 | A1* | 6/2023 | Bravick | G06Q 20/4016 |
| | | | | 705/75 |
| 2024/0022565 | A1* | 1/2024 | Keith, Jr. | H04L 63/0861 |
| 2024/0098086 | A1* | 3/2024 | Iranitalab | H04L 63/0876 |

OTHER PUBLICATIONS

European Patent Office. Extended European Search Report for Application No. 22847761.8, dated May 14, 2025 (8 pages).

* cited by examiner

TRUST SCORING SERVICE FOR FRAUD PREVENTION SYSTEMS

CROSS-REFERENCE TO RELATED APPLICATION

This application claims priority to, and the benefit of, U.S. Provisional Application No. 63/227,648, filed on Jul. 30, 2021, the contents of which are incorporated herein by reference.

BACKGROUND

Identity theft is typically difficult to prevent for two main reasons. First, conventional detection methods tend to fail because those methods are based on analysis of personally identifiable information (also referred to as "PII") (which may be stolen) or analysis of traffic properties (which may be obscured or faked). Second, conventional detection methods do not prevent loss because the conventional methods look at the data being entered, rather than a contextualized view of a user's behavior. In general, the conventional detection methods are reactive because the conventional detection methods require analysis after-the-fact to detect fraud and do not prevent fraud losses.

Reputation scores for entities may be used to help reduce or prevent fraud losses. External systems may use reputation scores as a service to a client and typically use only global anchors such as IP address, email address and email domain name in determining the reputation scores. Internal systems may use reputation scores internally to prevent fraud, malware, or phishing attacks. Along with global anchors such as internet protocol (IP) address, email address and email domain name, internal systems may also determine reputation scores using internal anchors, for example, a device identifier (ID).

SUMMARY

External and internal system may receive IP and email domain blacklists to determine reputation scores (also referred to as "risk factors"). However, these blacklists only provide reputation information for known and reported malicious incidents.

The IP and email domain blacklists do not provide predictive intelligence for IPs and email domains that have not been reported. Further, the reputation information is largely based on reported malicious incidents such as malware, spam and phishing attacks. The IP and email domain blacklists do not provide intelligence for fraud use-cases.

Additionally, the current focus of reputation scoring is correctly identifying devices to ensure history captures of the devices that may then be used to determine a reputation score based on the device behavior history. However, this focus does not solve the "cold start problem," where the device is seen for the first time and a reputation score based on a device behavior history is not possible. The "cold start problem" is especially problematic because tools (e.g., proxy services) are available that allow a device to change between different anchors (e.g., change observed IPs). The change between different anchors makes the "cold start problem" a more common and re-occurring problem.

Embodiments described herein relate to a trust scoring service for fraud prevention systems. The trust scoring service analyzes a device's attributes with a trust model generated from unsupervised machine learning to determine a trust score of the device. The trust scoring service determines trust scores using device attributes and, in some examples, changes in device attributes over time (in particular, anomalies in device attributes). The determination of trust scores on devices that have never been seen before is an improvement that solves the "cold start problem."

Further, the trust score is distinct from the reputation score (i.e., a fraud risk factor). The trust score is a representation of a predicted trust level of a device based on device attributes. The reputation score is a representation of a level of fraud risk associated with the device based on detected device behaviors and anchors (i.e., IP, account, device type).

One embodiment described herein is a fraud prevention system that includes a client server and a fraud prevention server. The fraud prevention server includes an electronic processor and a memory. The memory including a trust scoring service. When executing the trust scoring service, the electronic processor is configured to receive a trust score request of a device from the client server, generate, with a trust model, a trust score of the device, and responsive to generating the trust score, output the trust score to the client server in satisfaction of the trust score request, wherein the trust score is distinct from a risk factor, the trust score representing a predicted trust level of the device, and the risk factor representing a fraud risk level associated with the device based on one or more device behaviors.

Another embodiment described herein is a method. The method includes receiving, with a fraud prevention server, a trust score request of a device from a client server. The method includes generating, with a trust model of the fraud prevention server, a trust score of the device, that is distinct from a risk factor, the trust score representing a predicted trust level of the device, and the risk factor representing a fraud risk level associated with the device based on one or more device behaviors. The method also includes outputting, with the fraud prevention server, the trust score to the client server in satisfaction of the trust score request.

Yet another embodiment described herein is a non-transitory computer-readable medium. The non-transitory computer-readable medium includes receiving a trust score request of a device from a client server. The non-transitory computer-readable medium includes generating a trust score of the device that is distinct from a risk factor, the trust score representing a predicted trust level of the device, and the risk factor representing a fraud risk level associated with the device based on one or more device behaviors. The non-transitory computer-readable medium also includes outputting the trust score to the client server in satisfaction of the trust score request.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Other aspects of the embodiments will become apparent by consideration of the detailed description and accompanying drawings.

DETAILED DESCRIPTION

Embodiments described herein relate to a trust scoring service for a fraud prevention system, and environments and systems utilizing this service. The trust scoring service analyzes attributes of a device to determine whether the device is trustworthy. These attributes capture a variety of distinctive markers that are predictive of trustworthiness.

The trust scoring service covers "trustworthiness" in three specific areas. First, the trust scoring service identifies abnormal attribute values and discrepancies between attributes. This identification may be used directly in algorithmic logic, heuristic rules to identify suspicious data set for algorithm training and evaluation process.

Second, the trust scoring service identifies trust more globally and generally (i.e., not only specific to transactions within a client). In other words, the trust scoring service may perform a comparison against a bigger general population (e.g., a bigger general population of devices) independent of clients because a commonly seen set of device attributes seen in the past across the population may be used as a good prediction of "trust."

Third, the trust scoring service may identify other device attributes that may be useful in identifying anomalies. In other words, the trust scoring service is scalable and flexible and has the capability to expand the list of device attributes as new device attributes become available or are identified as useful in determining the "trust" of a device.

Figure 1:
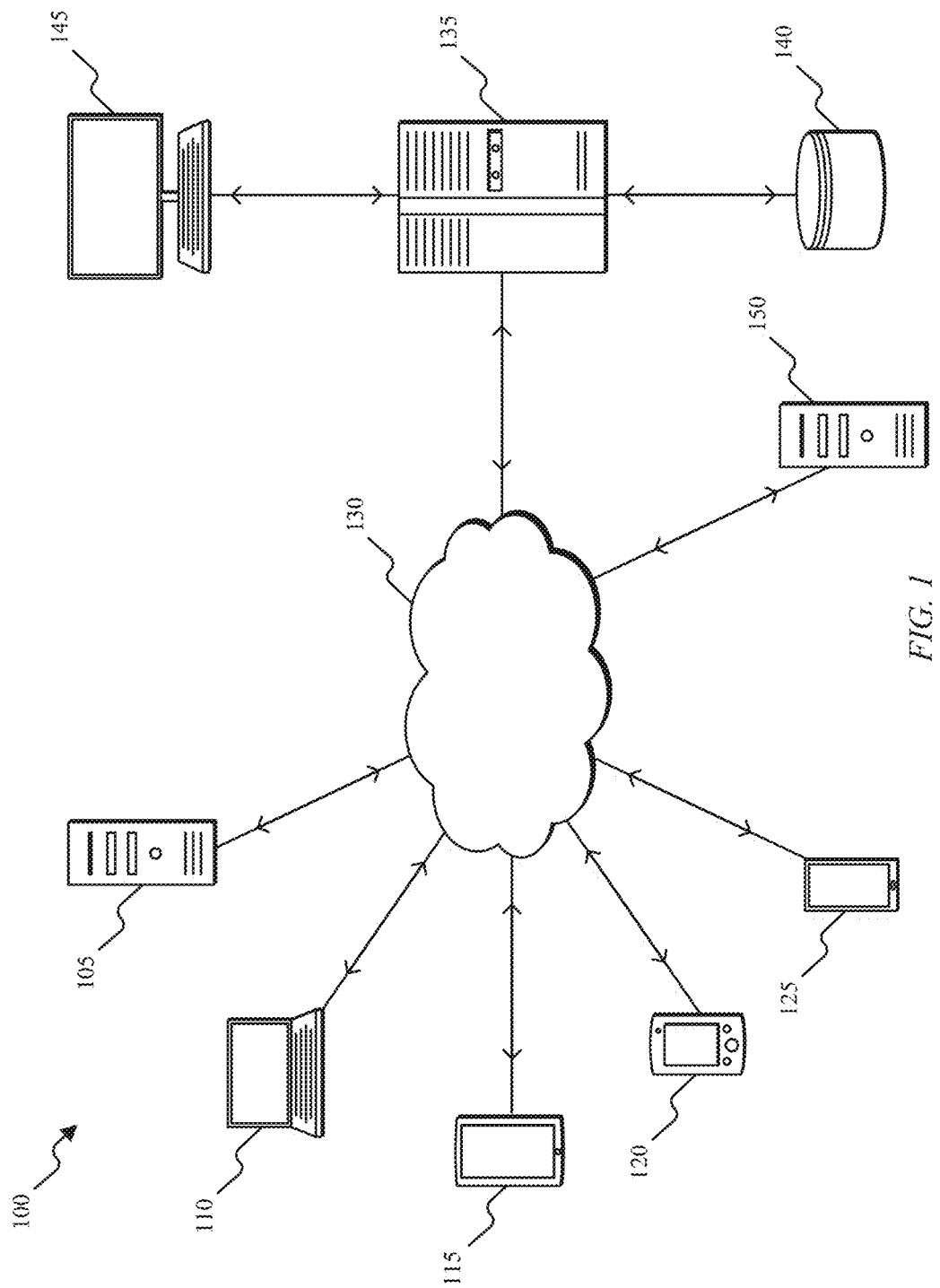
FIG. 1 is a diagram that illustrates a fraud prevention system for a trust scoring service that scores a device's trustworthiness, in accordance with various aspects of the present disclosure.

FIG. 1 is a diagram that illustrates a fraud prevention system 100 for a trust scoring service that scores a device's trustworthiness, according to embodiments described herein. The system 100 includes a plurality of user devices 105-125, a network 130, a fraud prevention server 135, a database 140, a server-side user interface 145 (e.g., a workstation), and a client server 150. The plurality of user devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the user devices 105-125 is configured to communicatively connect to the fraud prevention server 135 through the network 130 and provide information to the fraud prevention server 135 related to attributes or values for attributes of the user devices 105-125. Attributes of the user devices 105-125 include, for example, user agent, operating system, account ID, location, time of day, mouse location, or other suitable attribute information regarding both the user device and a user of the user device. Attribute information received from the user devices 105-125 at the fraud prevention server 135 may be stored in the database 140.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 105-125 and the network 130 are, for example, wired connections, wireless connections, or a combination of wireless and wired connections. The connection between the fraud prevention server 135 and the network 130 is a wired connection, wireless connection, or a combination of wireless and wired connections. The connection between the client server 150 and the network 130 is a wired connection, wireless connection, or a combination of wireless and wired connections.

The client server 150 is a server of a resource provider. For example, the client server 150 is a bank server that provides a credit card to a user that establishes an account with the bank.

Figure 2:
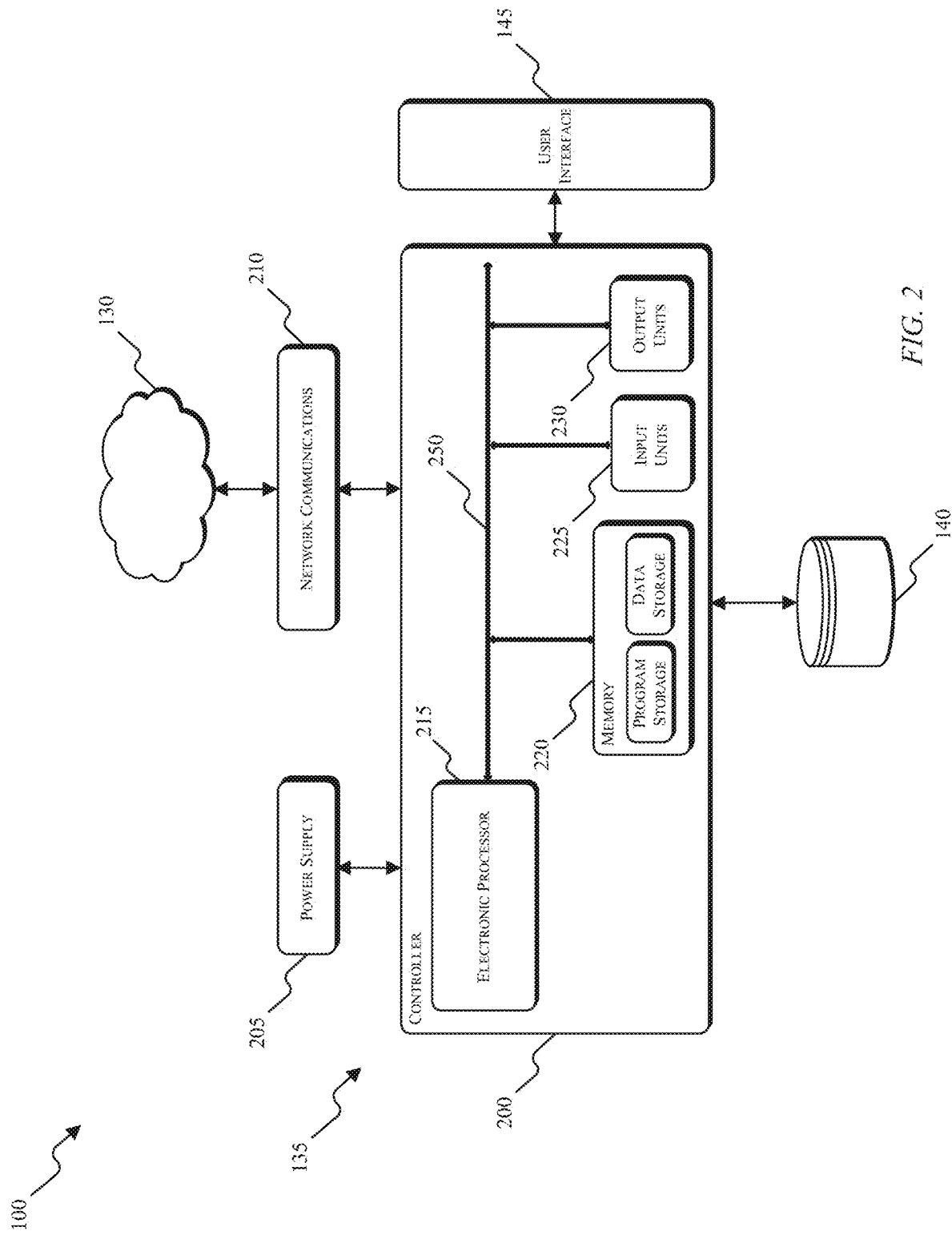
FIG. 2 is a block diagram that illustrates the server of the fraud prevention system of FIG. 1, in accordance with various aspects of the present disclosure.

FIG. 2 is a block diagram that illustrates the fraud prevention server 135 of the fraud prevention system 100 of FIG. 1, according to embodiments described herein. The fraud prevention server 135 is electrically and/or communicatively connected to a variety of modules or components of the system 100. For example, the illustrated fraud prevention server 135 is connected to the database 140 and the user interface 145. The fraud prevention server 135 includes a controller 200, a power supply module 205, and a network communications module 210. The controller 200 includes combinations of hardware and software that are configured to, for example, provide the trust service to evaluate anchors associated with the devices 105-125. The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230. The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the trust scoring service program (referred to herein as "trust scoring service") as described in greater detail below and a machine learning function.

The electronic processor 215 executes machine-readable instructions stored in the memory 220. For example, the electronic processor 215 may execute instructions stored in the memory 220 to perform the functionality of the trust scoring service and/or the machine learning function.

Machine learning generally refers to the ability of a computer program to learn without being explicitly programmed. In some embodiments, a computer program (for example, a learning engine) is configured to construct an algorithm based on inputs.

Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

Unsupervised learning involves an algorithm that learns patterns from untagged inputs. Unlike the supervised learning where the data is tagged, unsupervised learning captures patterns as probability densities. Unsupervised learning includes neural networks and probabilistic methods. Unsupervised learning is an algorithm that attempts to mimic the untagged inputs and uses the error associated with the outputs to correct the weights and biases in the algorithm.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the trust scoring service described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The user interface 145 includes a combination of digital and analog input or output devices required to achieve a desired level of control and monitoring of the system 100. For example, the user interface 145 includes a display (e.g., a primary display, a secondary display, etc.) and input devices such as a mouse, touchscreen displays, a plurality of knobs, dials, switches, buttons, or other suitable input device. The display is, for example, a liquid crystal display ("LCD"), a light-emitting diode ("LED") display, an organic LED ("OLED") display, or other suitable display.

The fraud prevention server 135 is configured to perform the trust scoring service to use unsupervised machine learning to train a trust model that determines a trust factor for a set of device attributes. The trust scoring service trains a trust model using: 1) scoring data that is historical anchor activity used to generate model features in order to predict anchor trust and/or 2) client feedback data that contains fraud/non-fraud and chargeback data.

Figure 3:
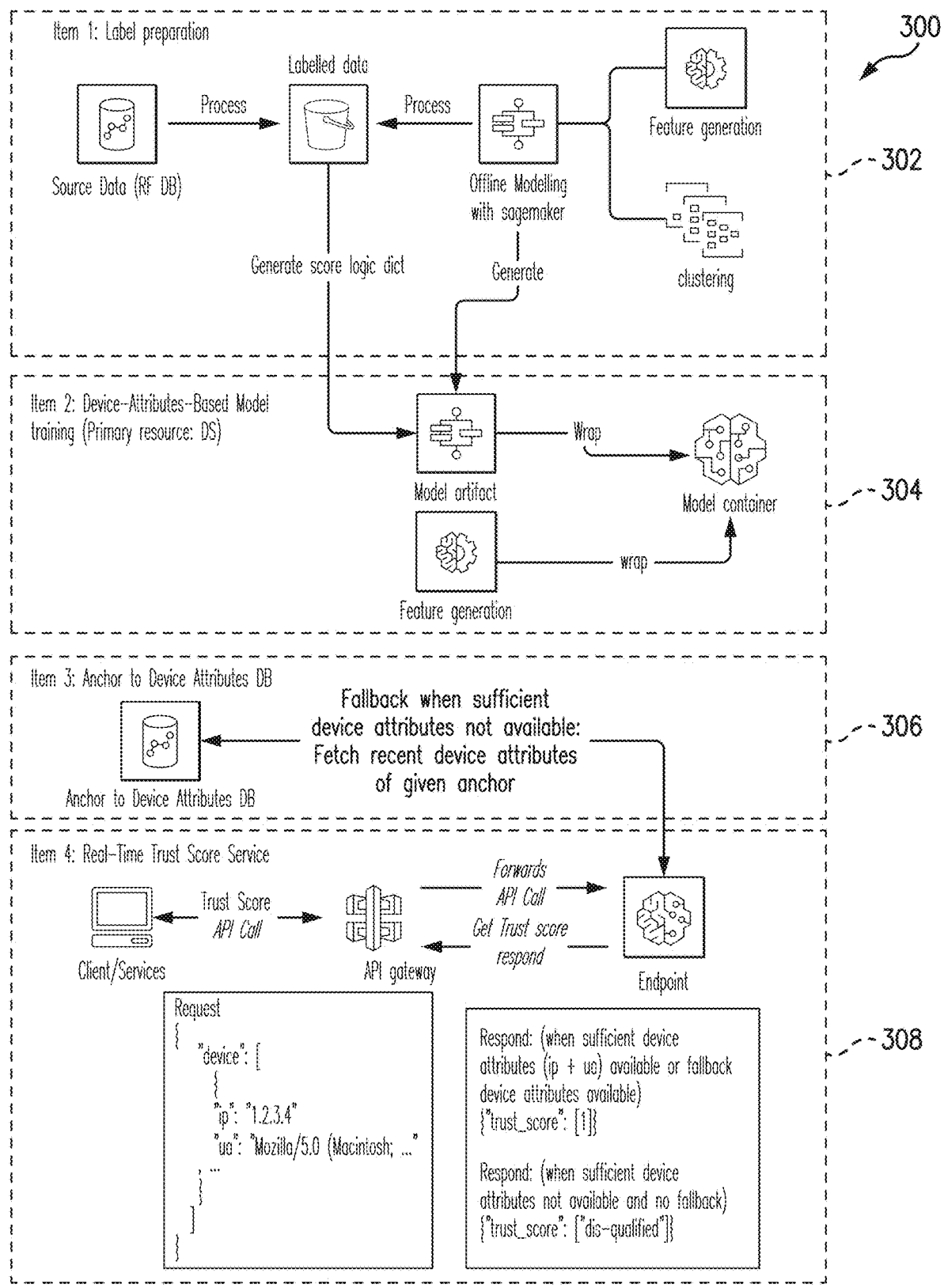
FIG. 3 is a diagram illustrating an example of the trust scoring service, according to various embodiments described herein.

FIG. 3 is a diagram illustrating an example of the trust scoring service 300, according to various embodiments described herein. In the example of FIG. 3, the trust scoring service 300 includes several components: 1) label preparation 302, 2) device attributes-based model training 304, 3) anchor to device attributes database 306, and 4) a real-time trust score service 308.

The label preparation component 302 collects/generates labelled data utilizing various methods, such as direct feedback data from clients, heuristic rule-based approach (i.e., known abnormal device attributes values), and "offline" un-supervised methods (i.e., clustering), and any other suitable labelled data techniques. Features derived from device attributes used for un-supervised methods are generated within the label preparation component. As this is an "offline" component, the feature store may be utilized to generate features that are more complex such as IP volume over time.

The device attributes-based model training component 304 trains a device-attributes-based model 310 for scoring trust using features derived from device attributes and labels generated from the label preparation component as inputs. The fraud prevention server 135 may also deploy the trained trust model 310 with an endpoint so that the real-time trust scoring service component 308 can consume the device-attributes-based model 310. Features used for real-time scoring are also generated within the device attributes-based model training component 304. When there is a need to retrain the model (e.g., new attributes become available, need to adjust the scale of the score, new label data becomes available, etc.), retraining will also happen in the device attributes-based model training component 304.

The trust scoring service 300 uses various device attributes to generate model features as part of the trust model 310 that then determines the trust factor. In some examples, the device attributes may include the following: 1) device—fields collected from JAVA script, 2) browser, 3) useragent (UA), 4) DeviceAuth, and 5) MobileDeviceData—fields extracted from Mobile SDK.

In some examples, the trust scoring service 300 may also perform feature selection and ranking by dropping features that provide marginal improvements in model performance, dropping features that are costly to calculate in production, eliminating features that contribute to model overfitting, and eliminating features that require exclusive data fields. For example, the trust scoring service 300 may generate the trust model 310 with N features, and after feature selection and ranking, may trim the features from N features to the M most important features, where M<N or M<<N. In some examples, the trust model 310 uses gradient boosting that learns to generate multiple decisions by looking at patterns between model features and client feedback data.

The trust model 310 may include some or all of the following model features: 1) ip, 2) ip_country, 3) useragent, 4) ua parsed properties, 5) colordepth, 6) abnormal_color_depth, 7) abnormal_int_color_depth, 8) language, 9) abnormal_language, 10) cookies, 11) abnormal_cookies, 12) locstorage, 13) abnormal_local_storage, 14) plugins, 15) frequent plugin, 16) abnormal_hash_value_plugin, 17) canvas, 18) frequent_canvas, 19) abnormal_hash_value_canvas, 20) webgl, 21) frequent_webgl, 22) abnormal_hash_value_webgl, 23) tz, 24) abnormal_timezone, 25) abnormal_int_tz, 26) screenres, 27) abnormal_screen_res, 28) abnormal_browserversion, 29) abnormal_platformversion, and 30) is_mobile.

The ip model feature is a raw categorical feature that considers a user's IP address and the data source is the IP address of the user's device. The ip_country model feature is a derived categorical feature that considers a country or region derived from the IP address of the user's device.

The useragent model feature is a raw categorical feature that considers a web header that relays information to the web server about the user device's browser and browser version, and the data source is the useragent of the user's device. The ua parsed properties model feature is a derived categorical feature that considers an operating system, browser family, device family, information that may be parsed from the useragent string.

The colordepth model feature is a raw numerical feature that considers a browser color depth (e.g., 16, 24, 30, 32 bits), and the data source is dfpmetrics—colorDepth:BrowserInfo. The abnormal_color_depth model feature is a derived numerical feature that indicates how likely a value of color depth matches with browser family (e.g., 1) not observed value, or 2) rarely observed). The abnormal_int_color_depth model feature is a derived numerical feature that indicates if there is an abnormal character found in the color depth number.

The language model feature is a raw categorical feature that considers browser language and can be used in combination with other model features (e.g., a time zone feature) to provide more information, and the data source is dfpmetrics—language.BrowserInfo. The abnormal_language model feature is a derived numerical feature that indicates how likely a value of language observed may be one of the following: 1) a not observed value, 2) a value not aligned with a modern browser, 3) a strange value.

The cookies model feature is a raw binary feature that considers whether cookies are allowed, and the data source is dfpmetrics—cookieData. The abnormal_cookies model feature is a derived numerical feature that indicates whether there is an abnormal character found in the cookies string.

The locstorage model feature is a raw binary feature that considers whether a browser configuration allows a user to choose to enable or disable webpages to use local storage, and the data source is dfpmetrics—localStorage. The abnormal_local_storage model feature is a derived numerical feature that indicates whether there is an abnormal character found in the local storage string.

The plugins model feature is a raw categorical feature that considers a hash code of the plugins installed in the browser, and the data source is dfpmetrics—hashedPlugins. The frequent_plugin model feature is a derived numerical feature that indicates whether the plugin signature is frequently observed. The abnormal_hash_value_plugin model feature is a derived numerical feature that indicates whether an abnormal character is found in the hash plugin string.

The canvas model feature is a raw categorical feature that considers whether an identification of the browser spec resulted from performing tests on the HTML5 <canvas> element in the browser, and the data source is dfpmetrics—canvasFingerprint. The frequent_canvas model feature is a derived numerical feature that indicates whether the canvas signature is frequently observed. The abnormal_hash_value_canvas model feature is a derived numerical feature that indicates whether there is an abnormal character found in the hashed canvas string.

The webgl model feature is a raw categorical feature that considers a hash code of the webgl signature from the browser specifications, and the data source is dfpmetrics—webglFingerprint. The frequent_webgl model feature is a derived numerical feature that indicates whether the webgl signature is frequently observed. The abnormal_hash_value_webgl model feature is a derived numerical feature that indicates whether there is an abnormal character found in the hashed webgl string.

The tz model feature is a raw numerical feature that considers a time zone difference between current local time and GMT in minutes, and the data source is dfpmetrics—time zone. The abnormal_timezone model feature is a derived numerical feature that indicates a level of abnormality of the time zone (e.g., 1) Null or 2) not standard value). The abnormal_int_tz model feature is a derived numerical feature that indicates whether there is an abnormal character found in the time zone number.

The screenres model feature is a raw categorical feature that considers a screen resolution and the dimensions of the current browser window, and the data source is dfpmetrics—screenDim:BrowserInfo. The abnormal_screen_res model feature is a derived numerical feature that indicates a level of abnormality of the screen resolution (e.g., 1) Null or 2) contains 0x-1x).

The abnormal_browserversion model feature is a derived numerical feature that indicates whether the version of browser is too old (e.g., −20 from most seen version) or too new (e.g., larger from most seen version). The abnormal_platformversion model feature is a derived numerical feature that indicates whether the version of operating system is too old (e.g., −20 from most seen version) or too new (e.g., larger than most seen version). The is_mobile model feature is a derived binary feature that indicates whether the request is from mobile based on useragent string parsing.

The anchor-to-device attributes database component 306 contains a list of recently seen device attributes for distinct IP and UDID anchors. The list may be used to fetch device attributes during IP and UDID fallback scoring.

The real-time trust score service component 308 returns the trust score for the IP and device attributes provided with the API call. The endpoint will host the trust model 310 trained by the device attributes-based model training component 304 and the fraud prevention server 135 makes a real-time prediction using the trust model 310.

Additionally, the real-time trust score service component 308 may use fallback scoring in certain situations. For example, the real-time trust score service component 308 may use fallback scoring when missing sufficient attributes to run the trust model 310, when only UDID is provided, and when only the IP address is provided. The real-time trust score service component 308 may use the provided UDID/IP as fallback anchors to retrieve a set of device attributes from recent record (e.g., the anchor-to-device attributes database) to run the device attributes-based model. In the event that none of the input data is available to cover any of the above (i.e., no IP, no UDID, and insufficient device attributes either as direct inputs or through database lookup), then the trust scoring request will be disqualified.

FIGS. 4-8 are diagrams illustrating observed devices in five different clusters 400-800 based on the trust model 310 of FIG. 3 and a KMeans clustering algorithm, according to embodiments described herein. In the first cluster 400 of FIG. 4, the count is 14,094, the majority of requests are from browser, and the majority of features are normal (marked as 1). Additionally, in the first cluster 400, the plugin, web graphic library (webgl), and canvas model features are usually frequent, although some canvas hashed values might contain abnormal behaviors. Lastly, in the first cluster 400, some of the browser_color_depth, screen resolution, language, and time zone model features are not provided (marked as −1). For those model features that are not provided, they are not found in look-up tables.

Look up tables contain device attributes information seen in the past (through a large amount of historical data), such as most seen platform version, latest browser version, expected language, time zone, or other suitable device attribute. The look up tables also define the expected normal. Further, any inputs that are deviating from the expected normal in population defined by the look up tables would result in lower trust scores.

Figure 5:
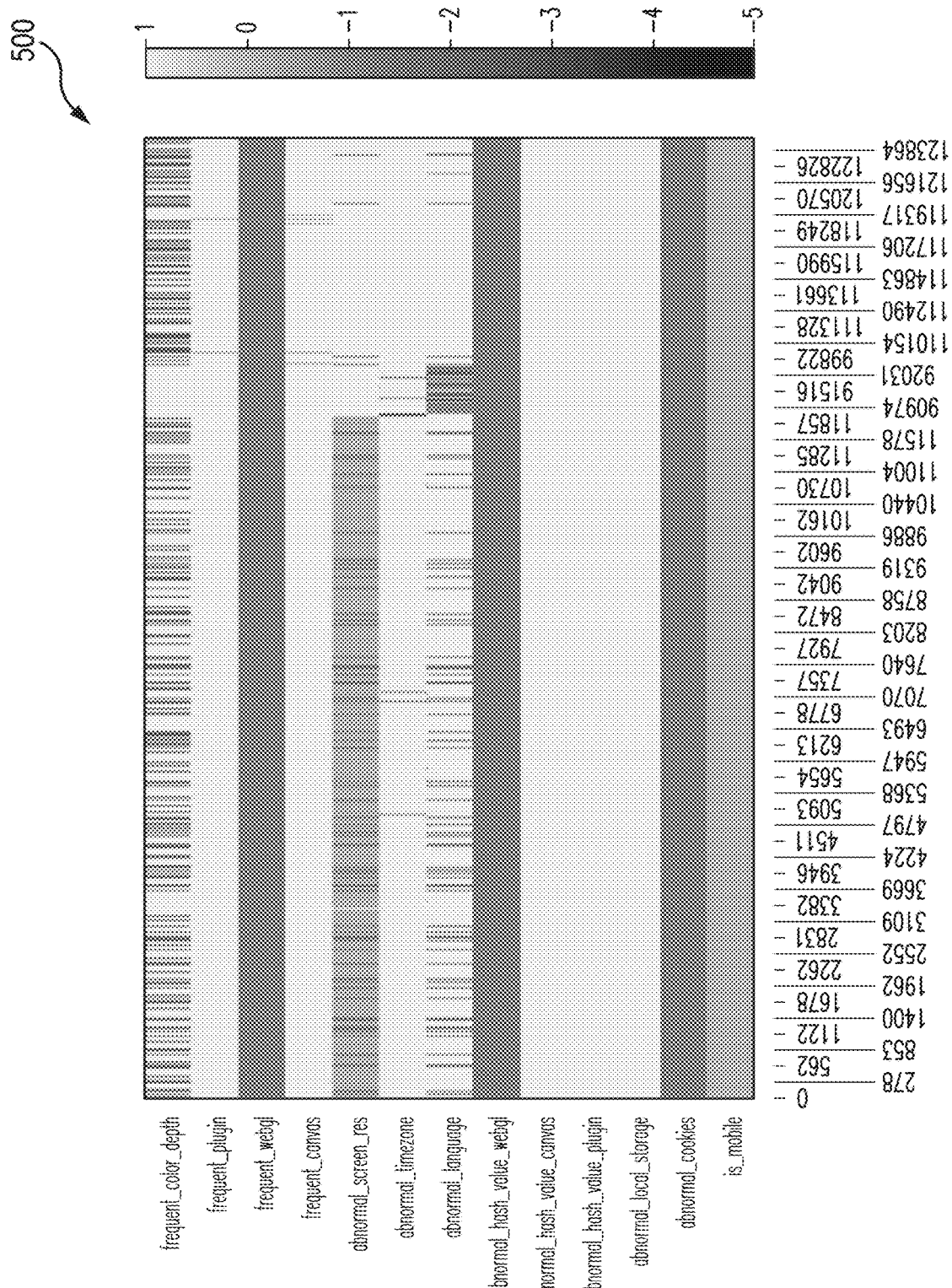

In the second cluster 500 of FIG. 5, the count is 14,112, the majority of requests are from browser, and the webgl and cookies model features are not provided. Additionally, in the second cluster 500, the screen resolution contains either a 0 or −1 and some browser_color_depth values could not be found in the look-up table. Lastly, in the second cluster 500, the language model feature includes some abnormal characters.

Figure 6:
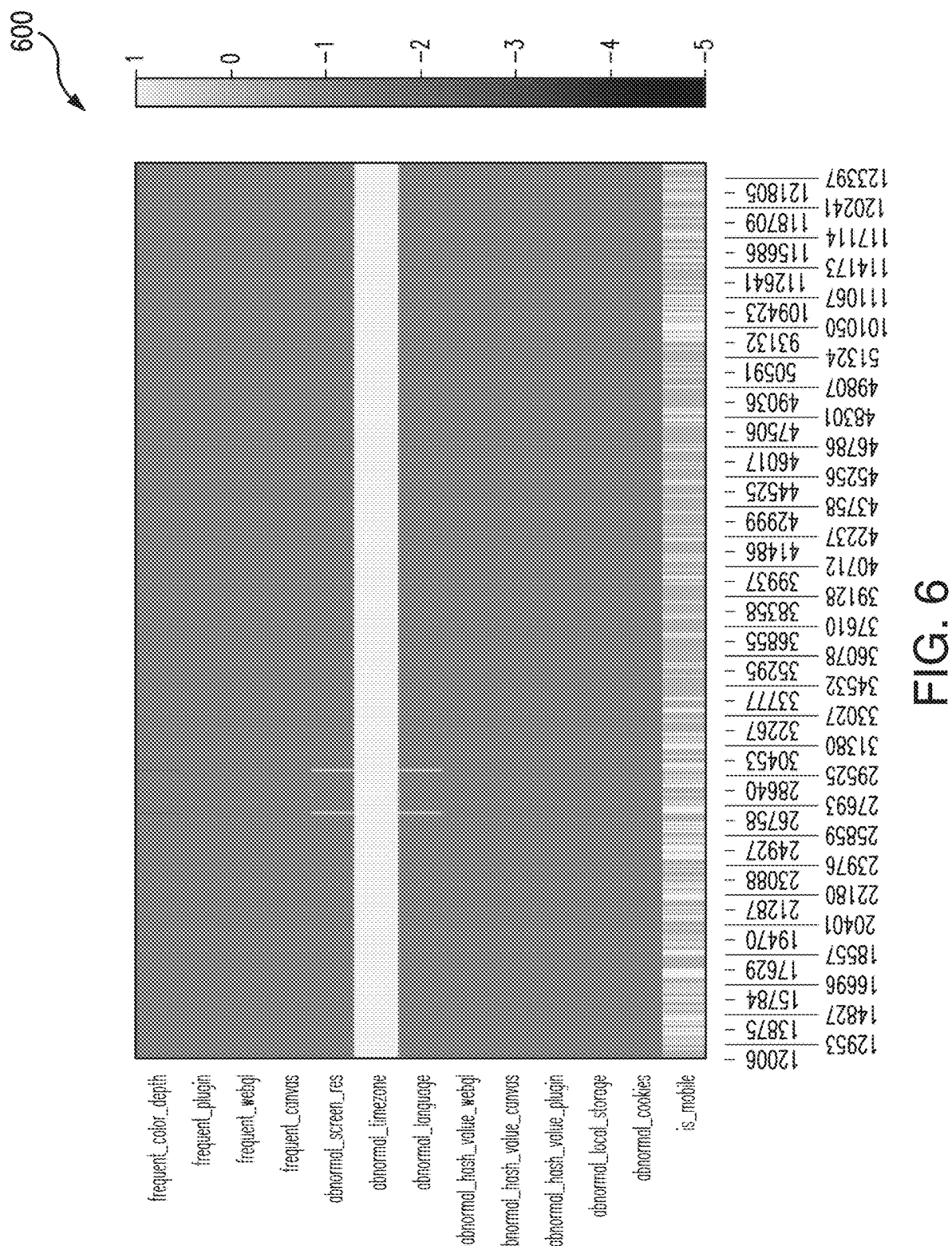

In the third cluster 600 of FIG. 6, the count is 33,027, the requests are from browser and mobile application, and data for the majority of features are not provided (marked as −1). Additionally, in the third cluster 600, the time zone values are normal.

Figure 7:
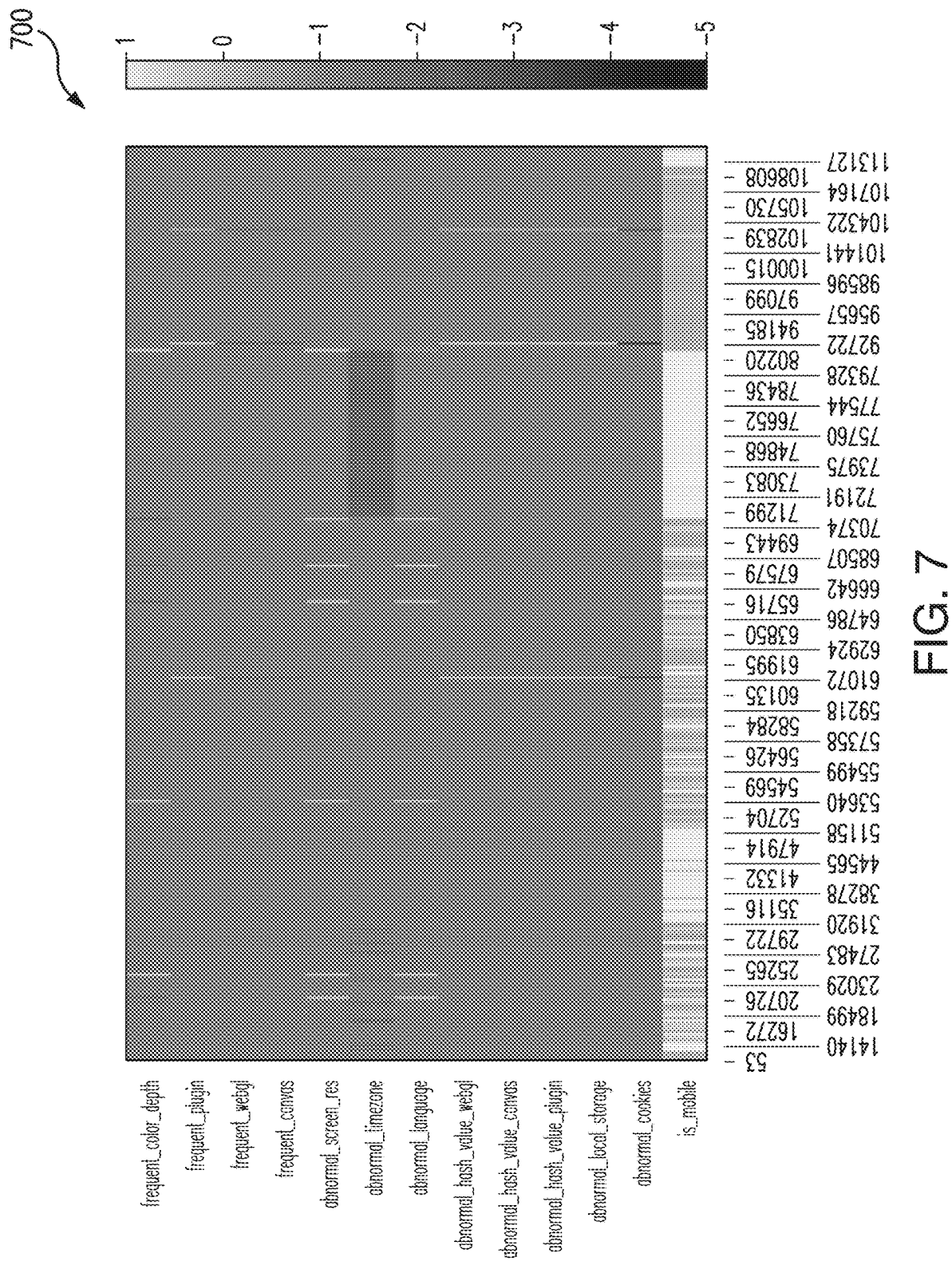

In the fourth cluster 700 of FIG. 7, the count is 53,515, the requests are from browser and mobile application, and data for the majority of features are not provided (marked as −1). Additionally, in the fourth cluster 700, some of the devices have out of range time zone values (e.g., greater than 10-hour difference between current time and reported time).

Figure 8:
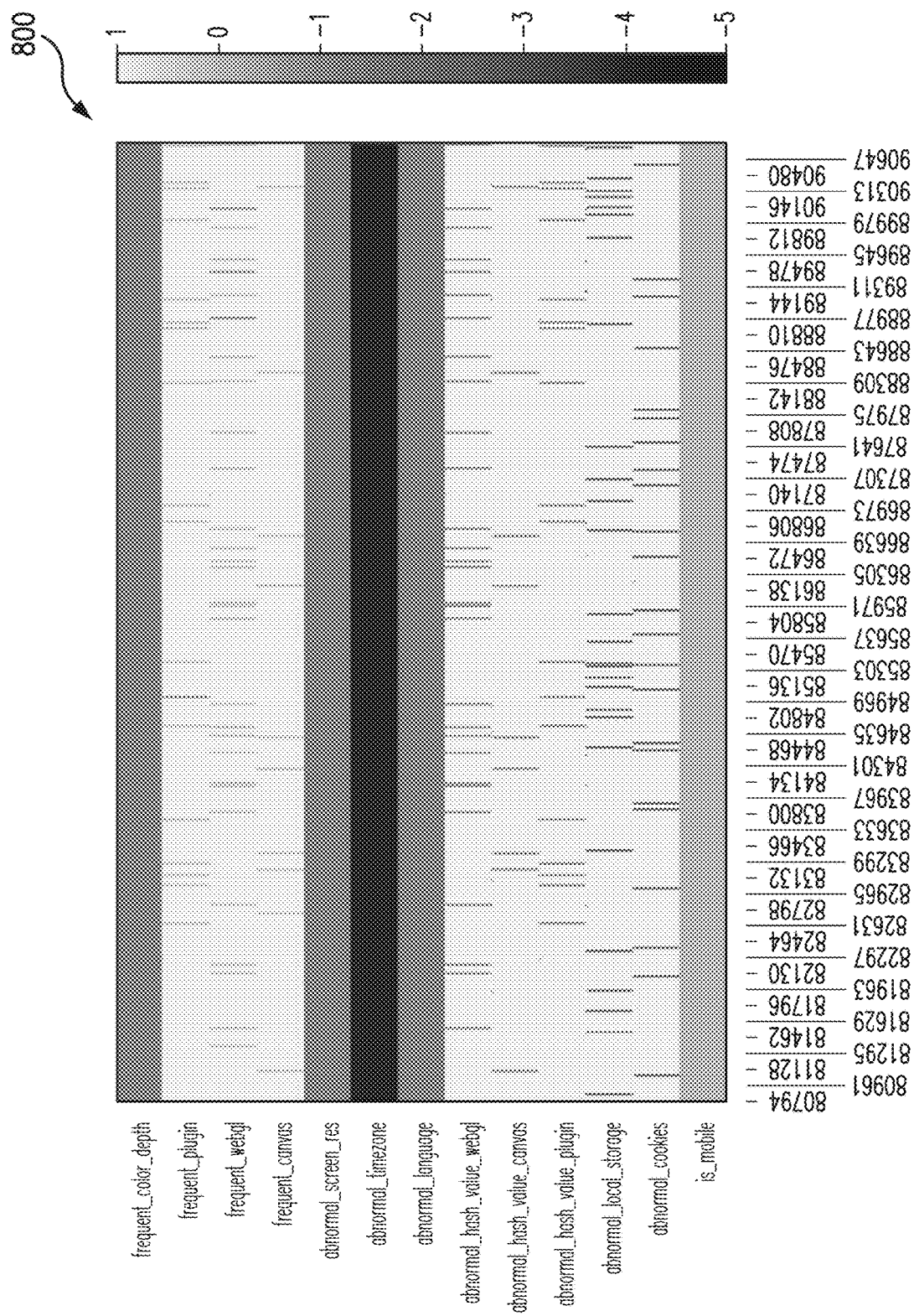

In the fifth cluster 800 of FIG. 8, the count is 10,011, the requests are from browser, and data for color_depth, screen resolution, language are not provided (marked as −1). Additionally, in the fifth cluster 800, some of the devices have abnormal characters in cookies and local storage (which should be a boolean value). Lastly, in the fifth cluster 800, abnormal time zone is observed across nearly all of the devices.

Figure 9:
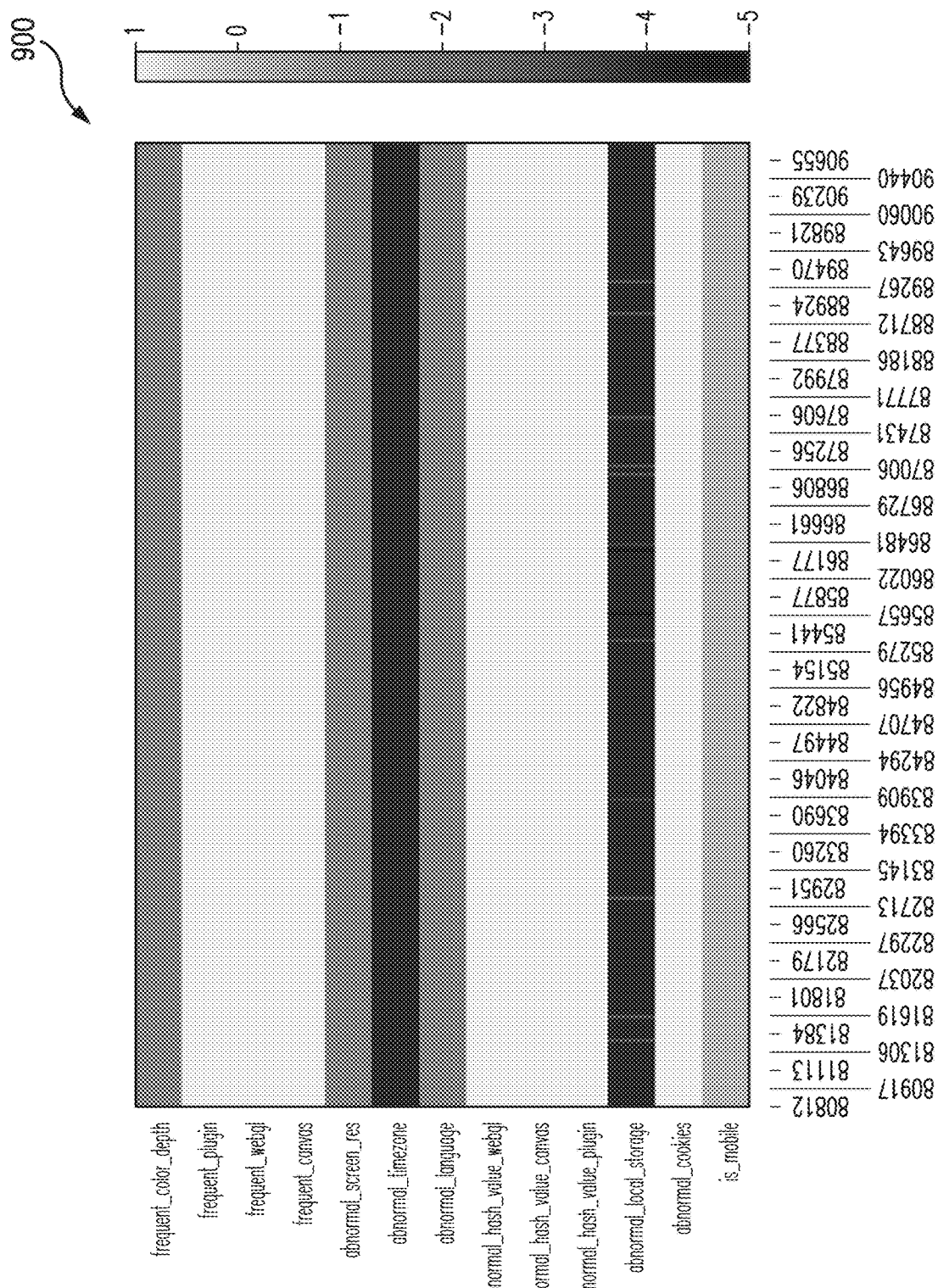
FIGS. 9 and 10 are diagrams illustrating observed devices in two different sub-clusters from the fifth cluster of FIG. 8 based on the trust model of FIG. 3 and a KMeans clustering algorithm, according to embodiments described herein.
Figure 10:
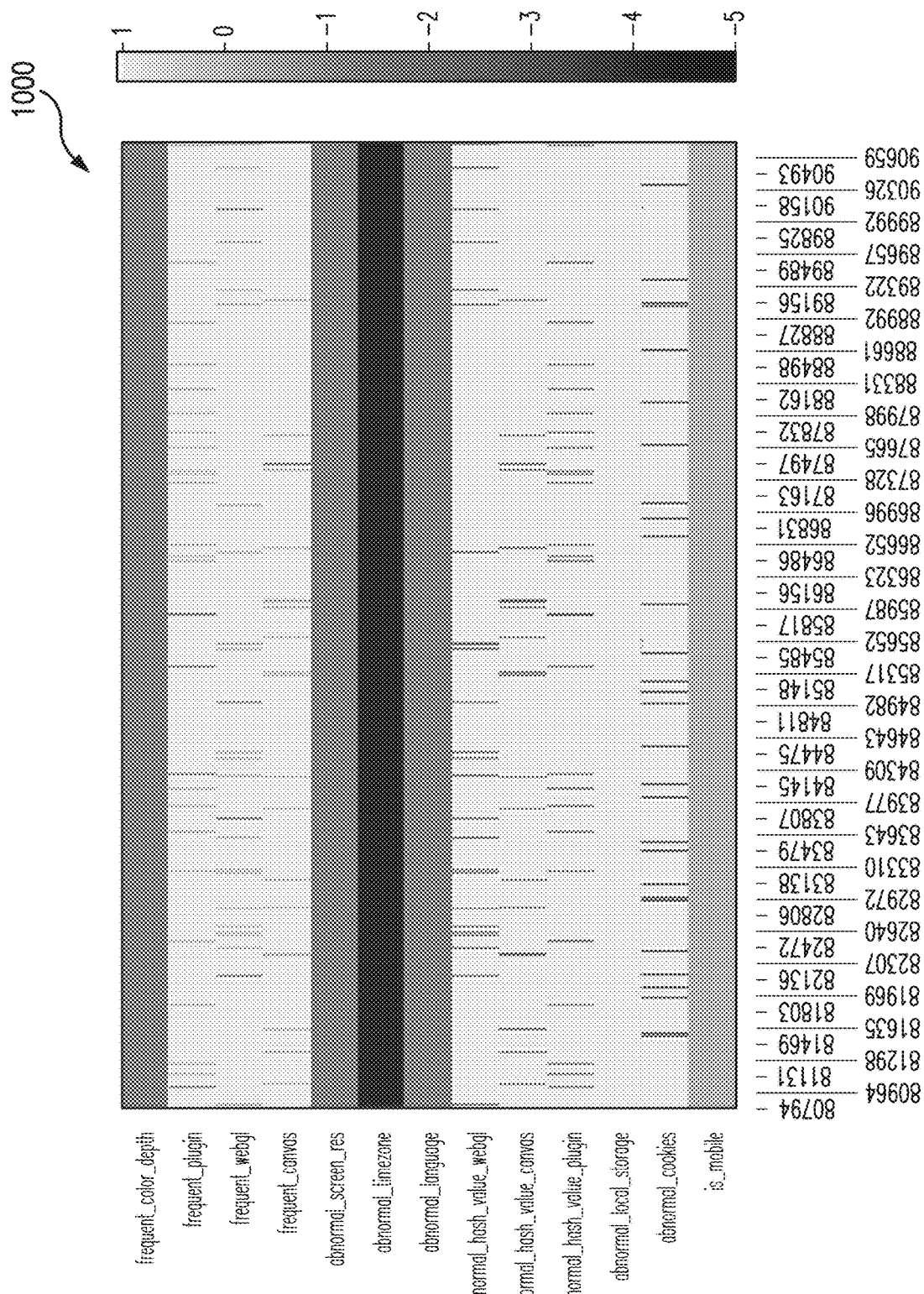

When the number of clusters are increased, more detailed separation is observed between the clusters. For example, FIGS. 9 and 10 are diagrams illustrating observed devices in two different sub-clusters from the fifth cluster 800 of FIG. 8 based on the trust model 310 of FIG. 3 and a KMeans clustering algorithm, according to embodiments described herein. The first sub-cluster 900 has observed devices with abnormal local storage and an abnormal time zone. The second sub-cluster 1000 has observed devices with the abnormal time zone. However, unlike the first sub-cluster 900, the second sub-cluster 1000 has a normal local storage.

Figure 4:
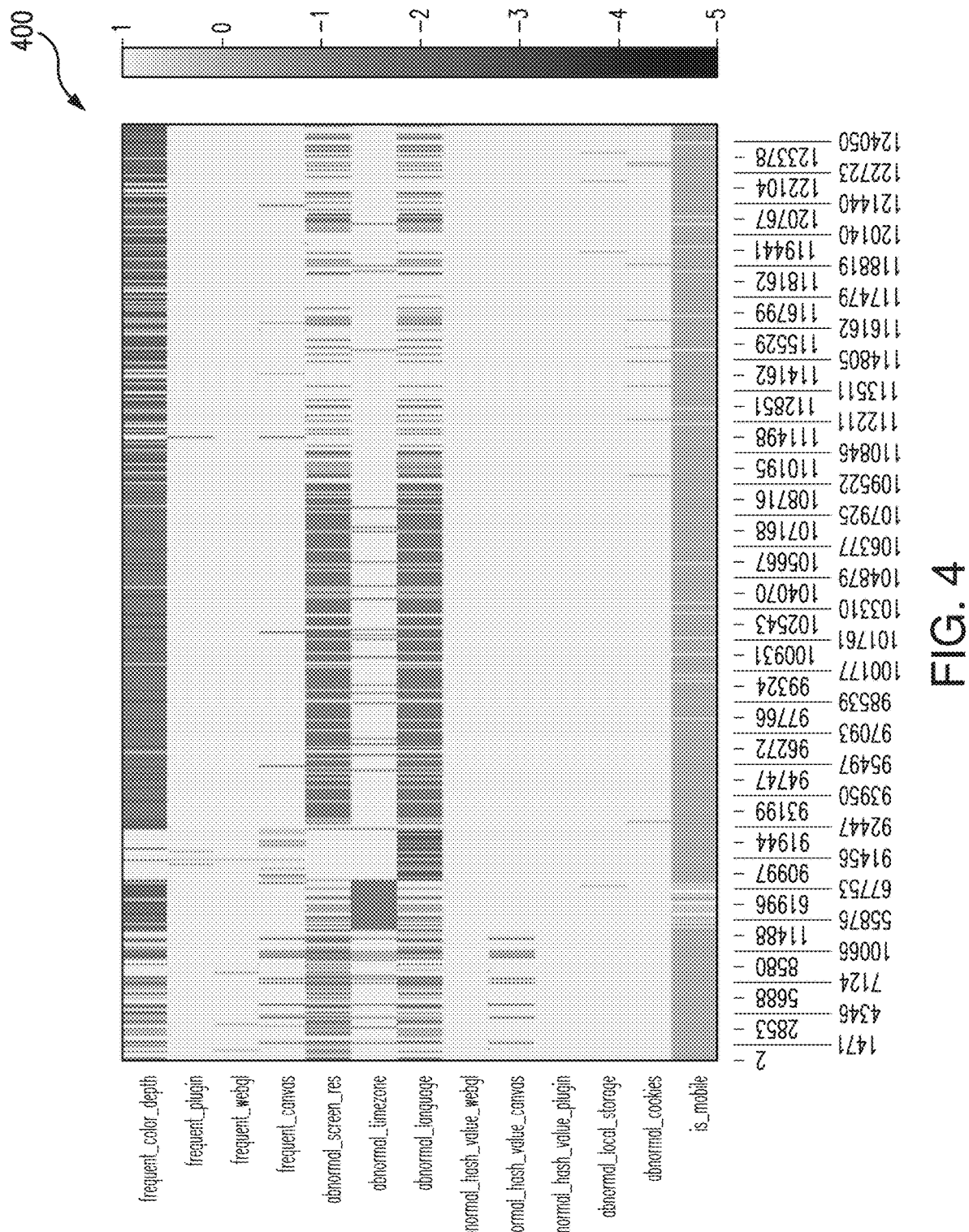
FIGS. 4-8 are diagrams illustrating observed devices in five different clusters based on the trust model of FIG. 3 and a KMeans clustering algorithm, according to embodiments described herein.
Figure 11:
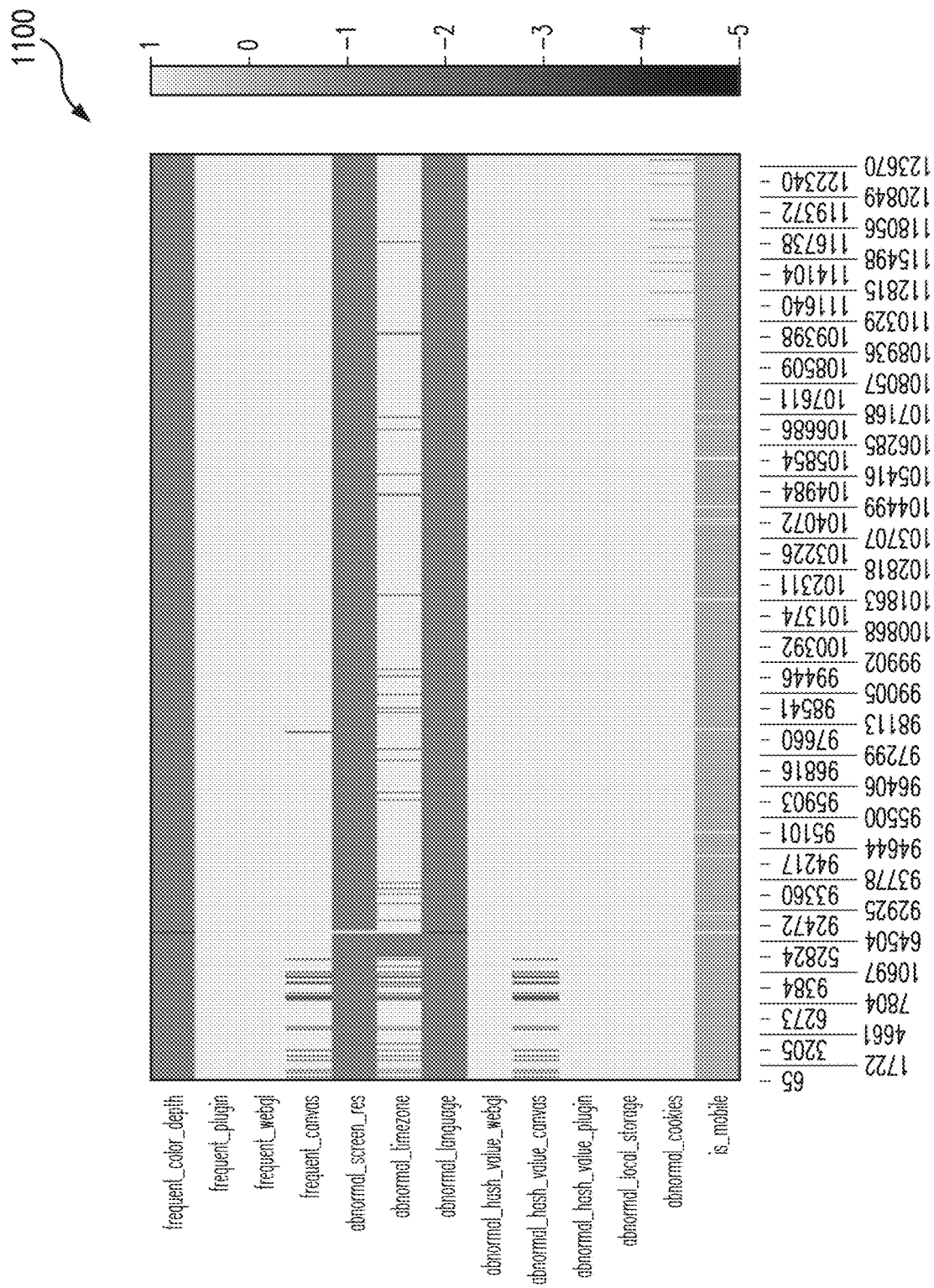
FIGS. 11-13 are diagrams illustrating observed devices in three different sub-clusters from the first cluster of FIG. 4 based on the trust model of FIG. 3 and a KMeans clustering algorithm, according to embodiments described herein.
Figure 12:
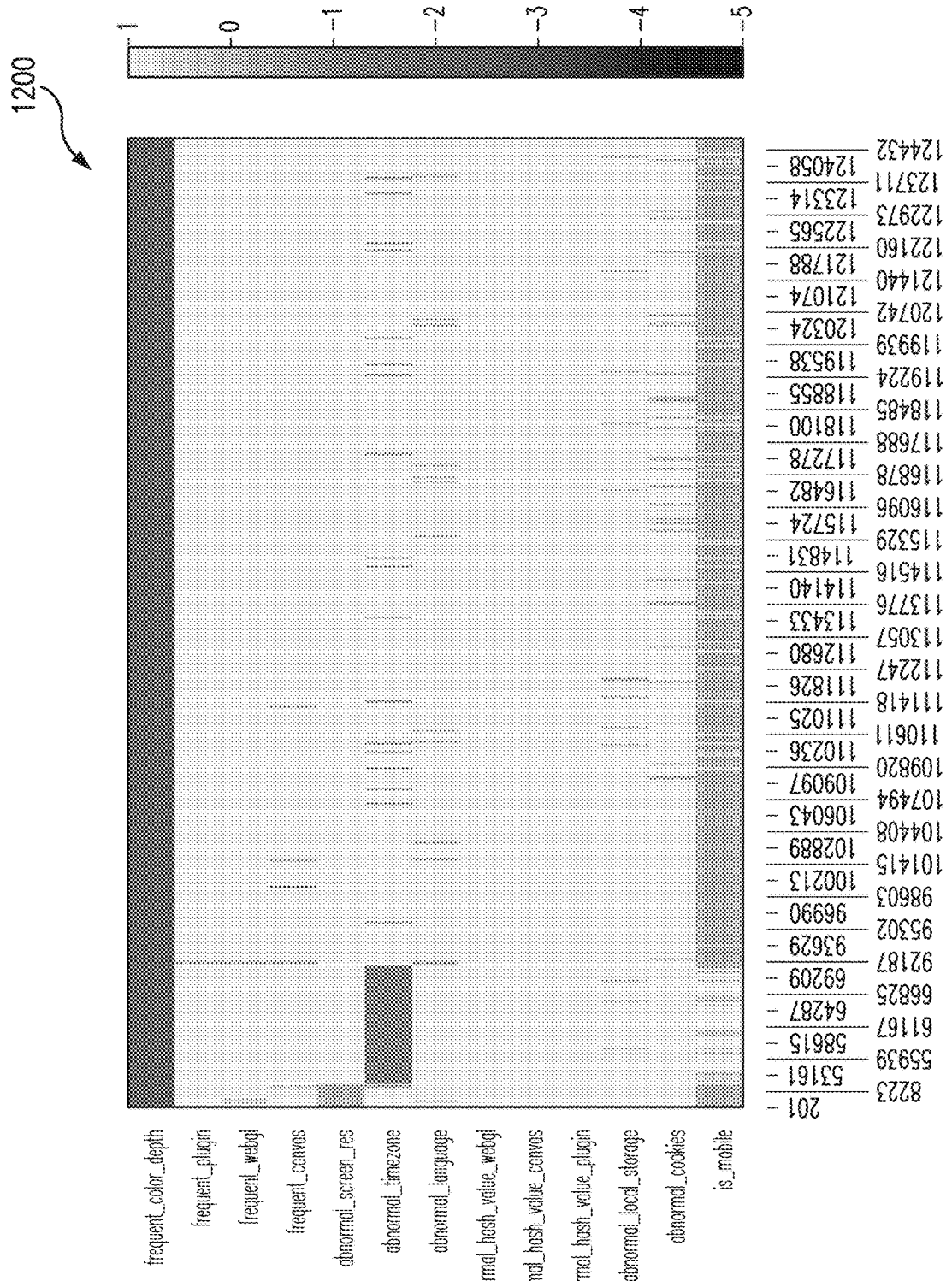
Figure 13:
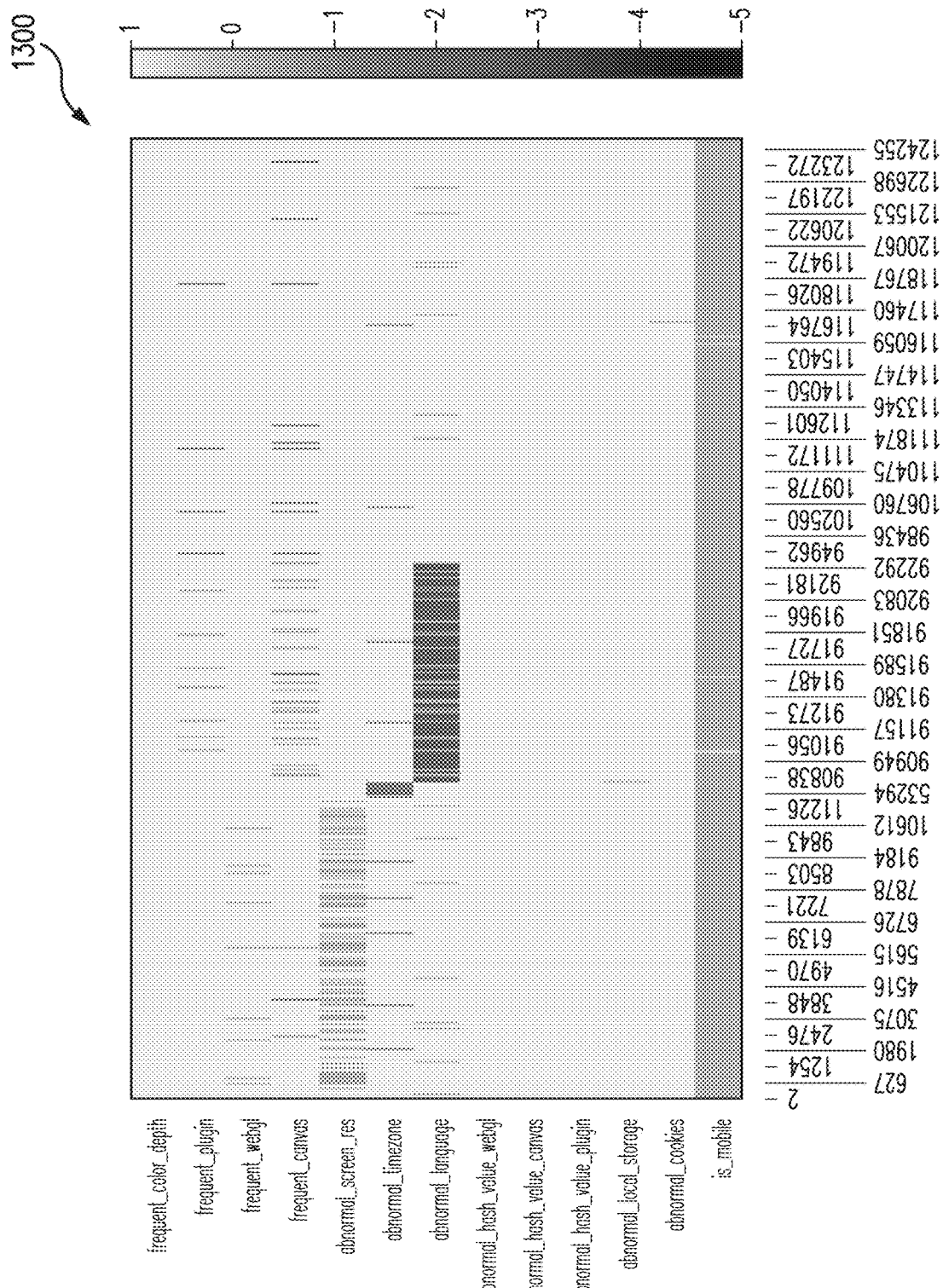

Additionally, in another example, FIGS. 11-13 are diagrams illustrating observed devices in three different sub-clusters from the first cluster 400 of FIG. 4 based on the trust model 310 of FIG. 3 and a KMeans clustering algorithm, according to embodiments described herein. The first sub-cluster 1100 has browser_color_depth, screen_res, and language not provided. The second sub-cluster 1200 has abnormal browser_color_depth. Lastly, the third sub-cluster 1300 has abnormal language.

Figure 14:
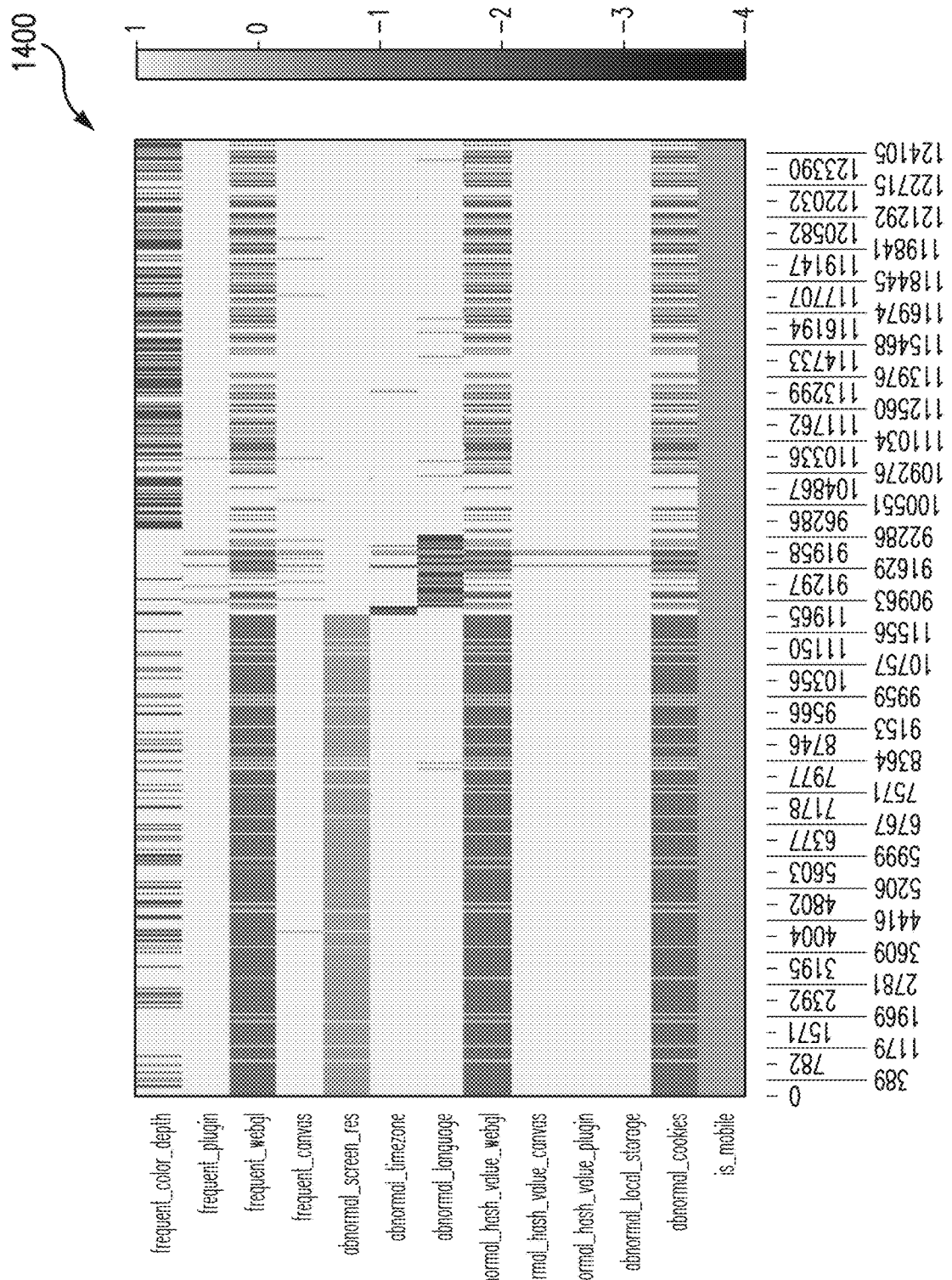
FIGS. 14-18 are diagrams illustrating observed devices in five different clusters based on the trust model of FIG. 3 and a Snorkey labelling algorithm, according to embodiments described herein.
Figure 15:
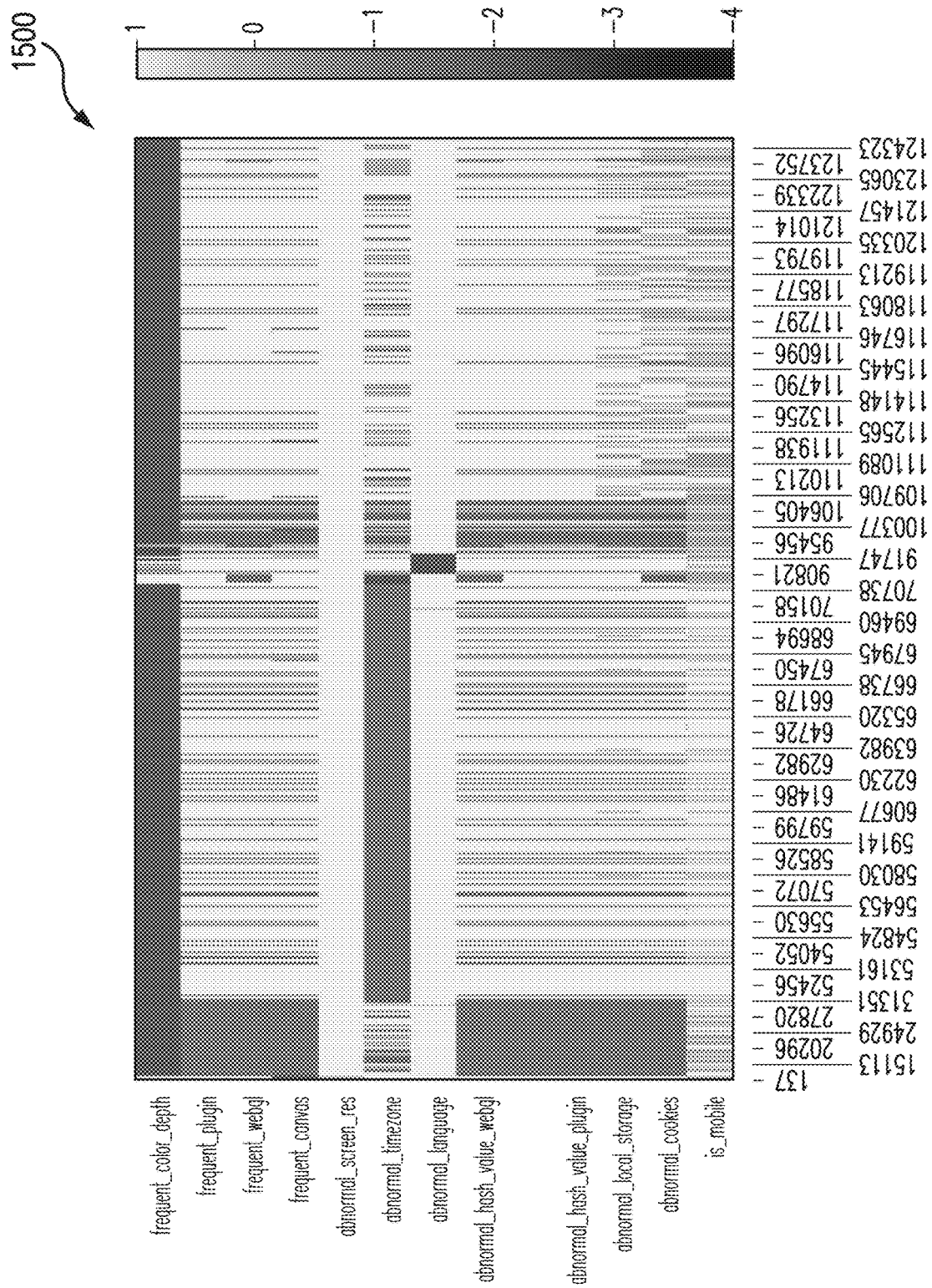
Figure 16:
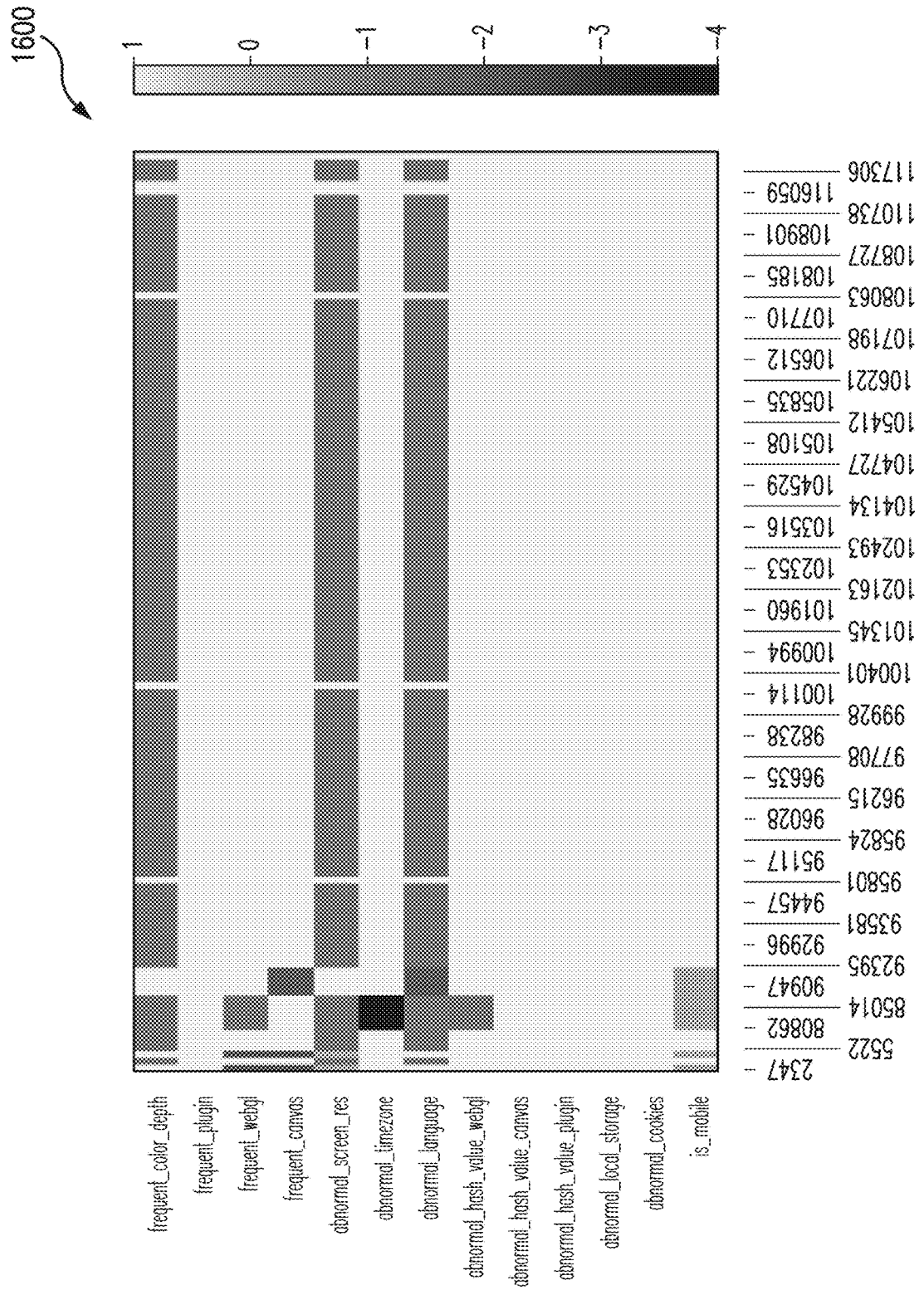
Figure 17:
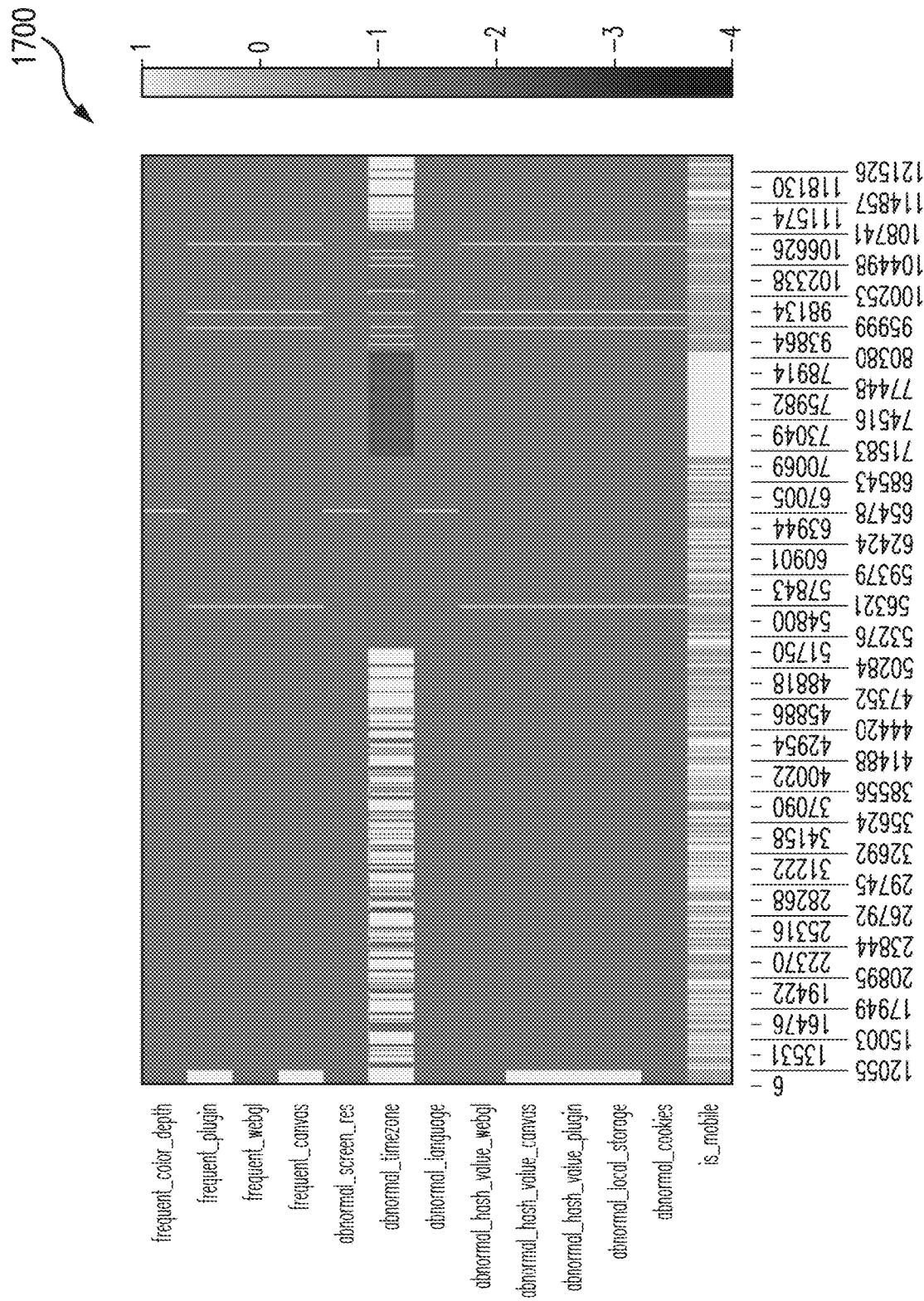
Figure 18:
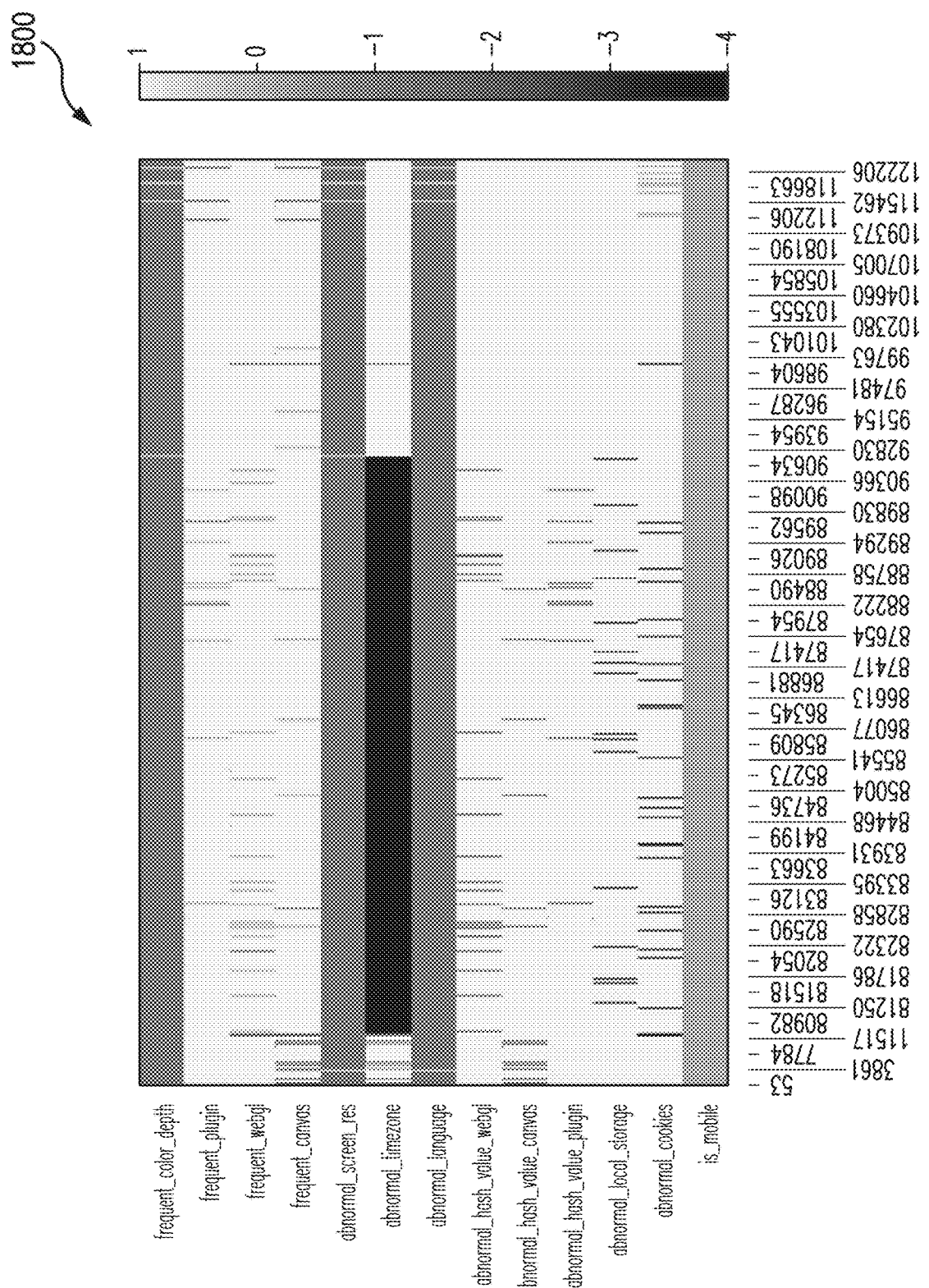

FIGS. 14-18 are diagrams illustrating observed devices in five different clusters 1400-1800 based on the trust model 310 of FIG. 3 and a Snorkey labelling algorithm, according to embodiments described herein. The first cluster 1400 of FIG. 14 is similar to the second cluster 500 as described above with some deviation, and the count is 19,327. The second cluster 1500 of FIG. 15 is similar to the first cluster 400 as described above with some deviation, and the count is 1,370. The third cluster 1600 of FIG. 16 is similar to the first cluster 400 as described above with some deviation, and the count is 132. The fourth cluster 1700 of FIG. 17 is most similar to the fourth cluster 700 as described above with some deviation, and the count is 87,906. Lastly, the fifth cluster 1800 of FIG. 18 is most similar to the fifth cluster 800 as described above with some deviation, and the count is 16,020.

Referring back to FIG. 3, the real-time trust score service component 308 may use the clusters 400-1800 to determine a trust score. To determine the trust score, in some examples, "trustworthy" traffic within a green score band without any abnormality flag may be treated as proxy trust-worthy labels. In these examples, Expression 1 below defines the trust rate.

$$\text{trust\_rate} = [\text{Count of "Trustworthy" Traffic/All Traffic}] \quad (1)$$

Additionally, to determine the trust score, the real-time trust score service component 308 may evaluate the "degree" of abnormalities observed in each cluster in Expression 2, where the lower the abnormal values, the higher the "trustworthiness."

$$\text{abnormal\_score} = [1 - \text{average(abnormal values) across a list of defined abnormalities}] \quad (2)$$

Further, to determine the trust score, the real-time trust score service component 308 may calculate a cluster score with Expression 3.

$$\text{cluster\_score} = (\text{trust\_rate} + 1)/\text{abnormal\_score} \quad (3)$$

The higher the cluster score, the higher the trust score. For example, with respect to FIGS. 4-8, the cluster from clusters 400-800 with the lowest score will be mapped to a trust score of 1 and the cluster from clusters 400-800 with the highest score will be mapped to a trust score of 5. Further, when a clustering algorithm returns more than 5 clusters, another KMeans clustering method may be applied to re-group the clusters into 5 clusters and mapped accordingly.

In the above description of the real-time trust score service component 308, all abnormalities are treated with the same weight. However, in other examples, the real-time trust score service component 308 may assign different weights to abnormalities based on a sliding scale of the "seriousness" of the abnormality.

Figure 19:
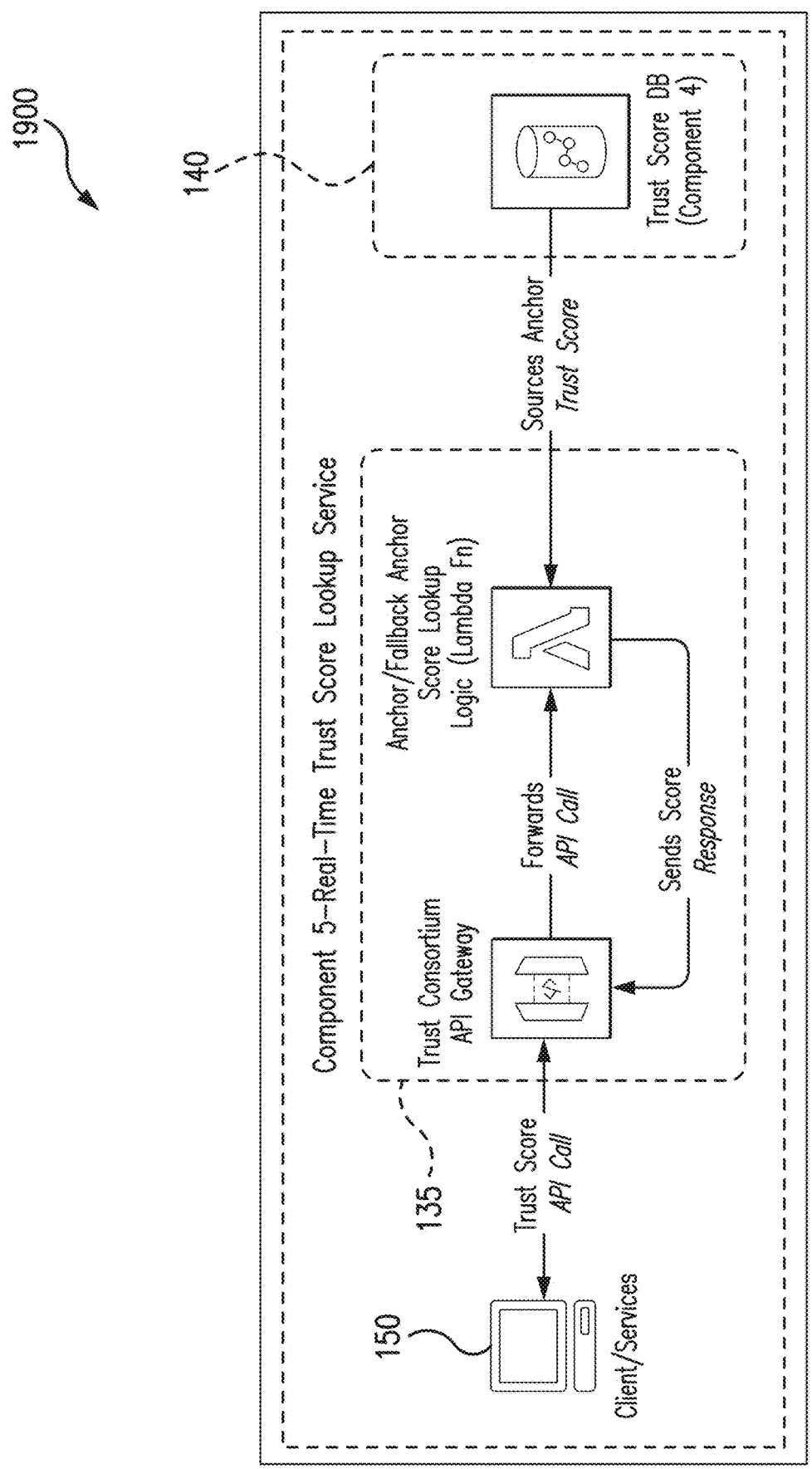
FIG. 19 is a flow diagram illustrating a flow of a real-time trust score look up service, according to embodiments described herein.

FIG. 19 is a flow diagram illustrating a flow of a real-time trust score look up service 1900, in accordance with various aspects of the present disclosure. As illustrated in FIG. 19, a client server 150 transmits a Trust Score API call to the fraud prevention server 135. The API gateway of the fraud prevention server 135 receives the Trust Score API call and forwards the API call to Device/Fallback Anchor Score Lookup logic of the fraud prevention server 135. After processing the API call with the Device/Fallback Anchor Score Lookup logic, the fraud prevention server 135 sources the Device Trust Score from the database 140.

Figure 20:
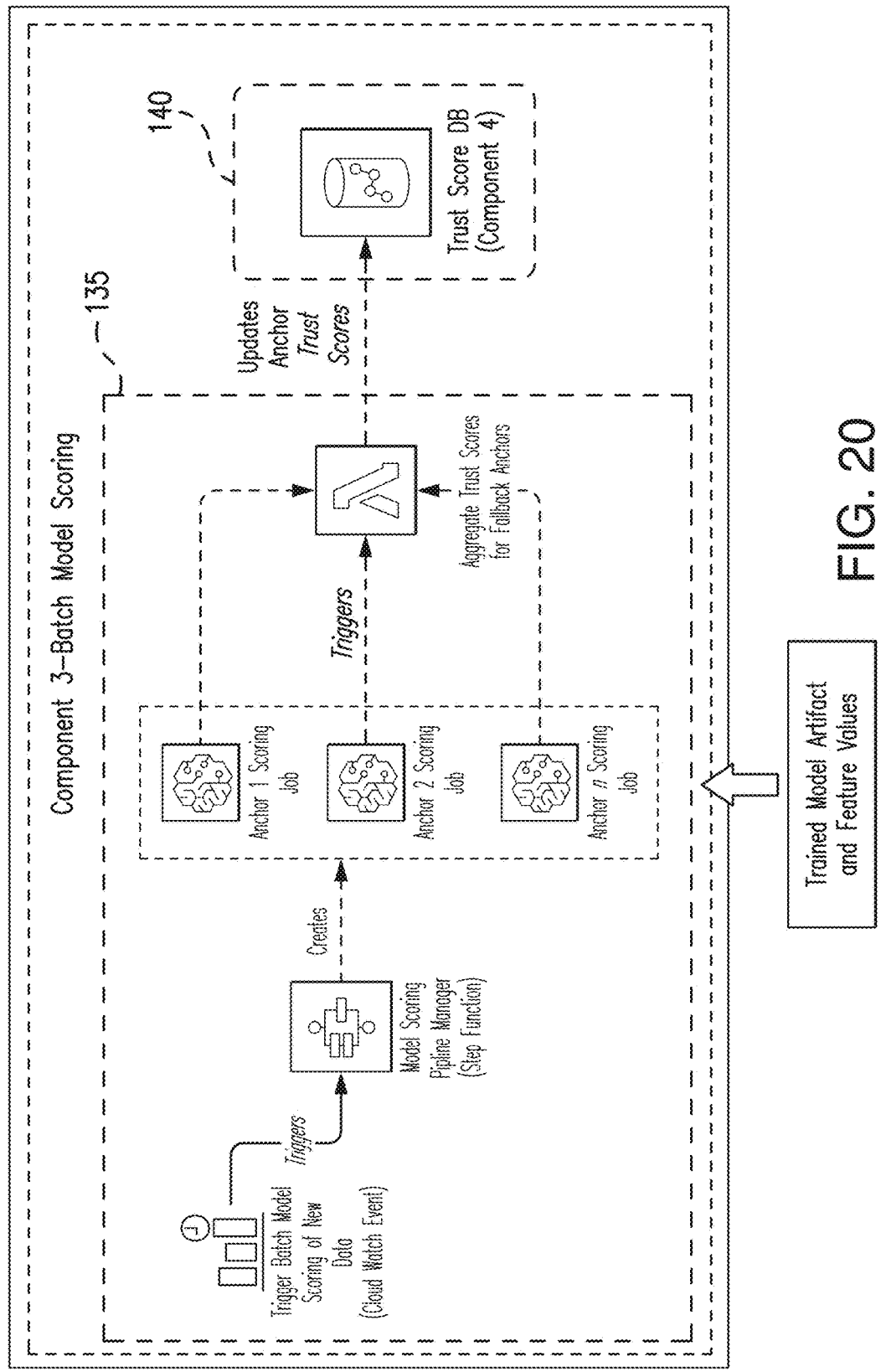
FIG. 20 is a flow diagram illustrating batch model scoring, according to embodiments described herein.

FIG. 20 is a flow diagram illustrating batch model scoring 2000, in accordance with various aspects of the present disclosure. As illustrated in FIG. 20, a trigger of batch model scoring of new data triggers a model pipeline manager. The model pipeline manager creates n number of device scoring jobs that are scored with the trust model. The n number of device scoring jobs also triggers an aggregate of trust scores for fallback anchors that updates the anchor trust scores in the database 140.

The batch model scoring 2000 may be run in a batch manner. For example, the batch model scoring 2000 may run daily, every certain number of hours, or other suitable periodic time interval.

Figure 21:
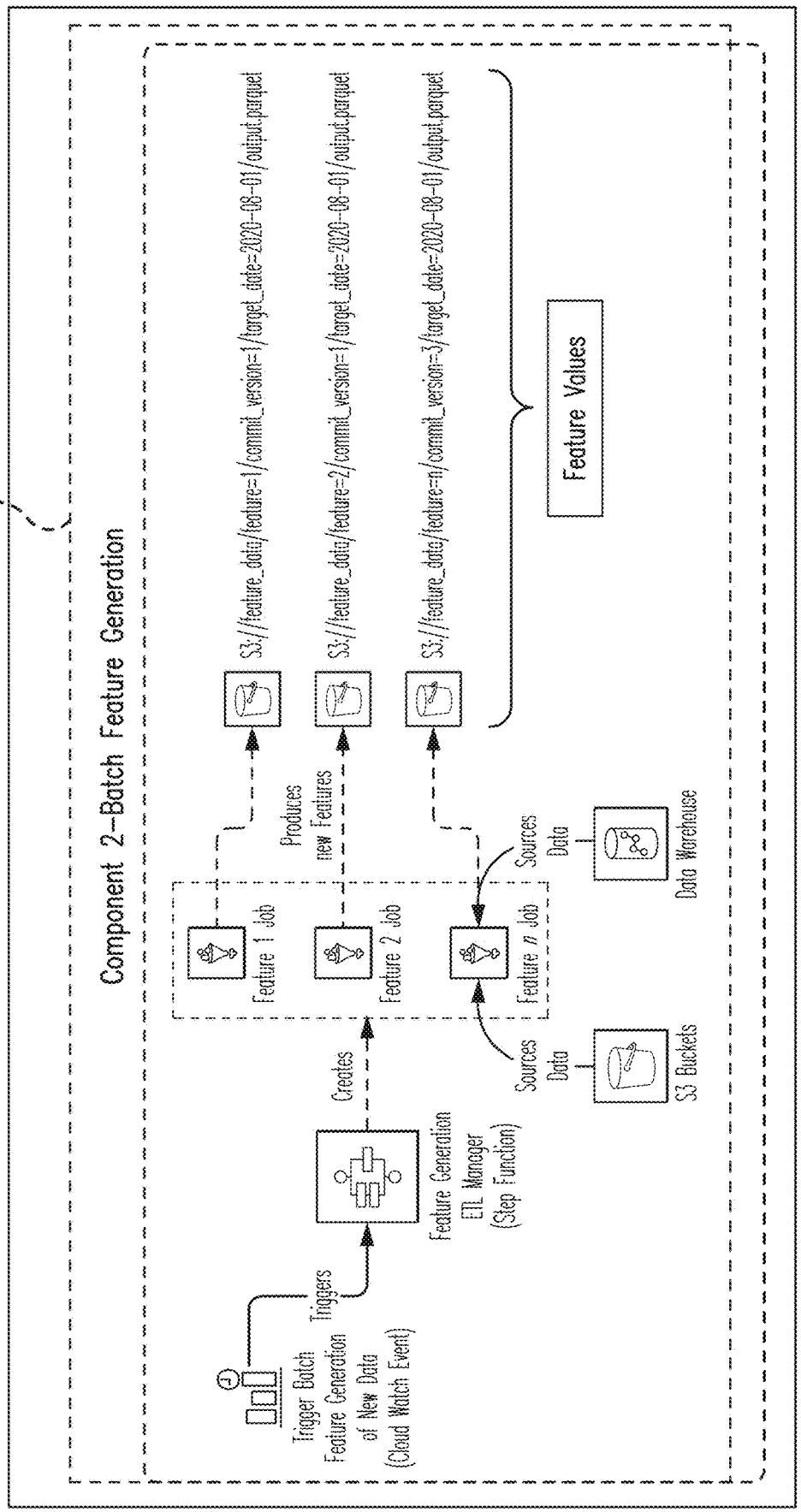
FIG. 21 is a flow diagram illustrating batch model feature generation, according to embodiments described herein.

FIG. 21 is a flow diagram illustrating batch model feature generation 2100, in accordance with various aspects of the present disclosure. As illustrated in FIG. 10, a trigger of batch feature generation of new data triggers a feature generation ETL manager. The feature generation ETL manager creates n number of feature generation jobs that are created from two different source datasets. The n number of feature generation jobs generates new model features that may be used for new scoring of existing or new anchors.

The batch model feature generation 2100 may be run in a batch manner. For example, the batch model feature generation 2100 may run daily, every certain number of hours, or other periodic time interval.

Thus, embodiments described herein provide, among other things, a trust scoring service for a fraud prevention system. Various features and advantages are set forth in the following claims.

What is claimed is:

1. A fraud prevention system comprising:
a client server; and
a fraud prevention server including an electronic processor and a memory, the memory including a trust scoring service,
wherein, when executing the trust scoring service, the electronic processor is configured to
receive a trust score request of a device from the client server,
generate, with a trust model, a trust score of the device, and
responsive to generating the trust score, output the trust score to the client server in satisfaction of the trust score request,
wherein the trust score is distinct from a risk factor, the trust score representing a predicted trust level of the device, and the risk factor representing a fraud risk level associated with the device based on one or more device behaviors,
wherein the trust score request includes information indicating device attributes associated with the device, and
wherein, when executing the trust scoring service, the electronic processor is further configured to
determine whether the device attributes are sufficient for generating the trust score of the device,
responsive to determining that the device attributes are not sufficient for generating the trust score of the device, output a null trust score to the client server in satisfaction of the trust score request, and
responsive to determining that the device attributes are sufficient for generating the trust score of the device, output the trust score to the client server in satisfaction of the trust score request.

2. The fraud prevention system of claim 1, wherein, when executing the trust scoring service, the electronic processor is further configured to
determine whether the device has a pre-existing trust score,
responsive to determining that the device has the pre-existing trust score, retrieve the pre-existing trust score from a database,
responsive to retrieving the pre-existing trust score, output the pre-existing trust score to the client server in satisfaction of the trust score request,
responsive to determining that the device does not have the pre-existing trust score, output a null pre-existing trust score to the client server in satisfaction of the trust score request.

3. The fraud prevention system of claim 1, wherein, to determine whether the device attributes are sufficient for generating the trust score of the device, the electronic processor is further configured to determine whether the device attributes are sufficient for generating the trust score of the device without an IP address associated with the device.

4. The fraud prevention system of claim 1, wherein the device attributes include a plugin attribute, a web graphics library (WebGL) attribute, a canvas attribute, a screen resolution attribute, a time zone attribute, a language attribute, a local storage attribute, a cookies attribute, and a device type attribute.

5. The fraud prevention system of claim 1, wherein the trust score request includes information indicating device attributes associated with the device, and
wherein, to generate, with the trust model, the trust score of the device, the electronic processor is configured to determine, with the trust model, a plurality of device clusters based on a population of device attributes, the population of device attributes including the device attributes associated with the device and a plurality of device attributes associated with other devices, and each of the plurality of device clusters is mapped to one trust score of a plurality of trust scores, determine one device cluster of the plurality of device clusters that includes the device, and determine the trust score of the device from the one trust score that is mapped to the one device cluster.

6. The fraud prevention system of claim 5, wherein the electronic processor is further configured to determine whether the plurality of device clusters is greater than a threshold, responsive to determining that the plurality of device clusters is greater than the threshold, re-determine, with the trust model, a second plurality of device clusters based on the population of device attributes, and the each of the plurality of device clusters is mapped to the one trust score of the plurality of trust scores, wherein the second plurality of device clusters is equal to or less than the threshold.

7. A method comprising:

receiving, with a fraud prevention server, a trust score request of a device from a client server;

generating, with a trust model of the fraud prevention server, a trust score of the device, that is distinct from a risk factor, the trust score representing a predicted trust level of the device, and the risk factor representing a fraud risk level associated with the device based on one or more device behaviors; and outputting, with the fraud prevention server, the trust score to the client server in satisfaction of the trust score request, wherein the trust score request includes information indicating device attributes associated with the device, the method further comprising:

determining whether the device attributes are sufficient for generating the trust score of the device;

outputting a null trust score to the client server in satisfaction of the trust score request in response to determining that the device attributes are not sufficient for generating the trust score of the device; and outputting the trust score to the client server in satisfaction of the trust score request and in response to determining that the device attributes are sufficient for generating the trust score of the device.

8. The method of claim 7, further comprising:

determining whether the device has a pre-existing trust score;

retrieving the pre-existing trust score from a database in response to determining that the device has the pre-existing trust score;

outputting the pre-existing trust score to the client server in satisfaction of the trust score request in response to retrieving the pre-existing trust score; and outputting a null pre-existing trust score to the client server in satisfaction of the trust score request in response to determining that the device does not have the pre-existing trust score.

9. The method of claim 7, wherein determining whether the device attributes are sufficient for generating the trust score of the device further includes determining whether the device attributes are sufficient for generating the trust score of the device without an IP address or associated with the device.

10. The method of claim 7, wherein the device attributes include a plugin attribute, a web graphics library (WebGL) attribute, a canvas attribute, a screen resolution attribute, a time zone attribute, a language attribute, a local storage attribute, a cookies attribute, and a device type attribute.

11. The method of claim 7, wherein the trust score request includes information indicating device attributes associated with the device, and wherein generating, with the trust model, the trust score of the device further includes determining, with the trust model, a plurality of device clusters based on a population of device attributes, the population of device attributes including the device attributes associated with the device and a plurality of device attributes associated with other devices, and each of the plurality of device clusters is mapped to one trust score of a plurality of trust scores, determining one device cluster of the plurality of device clusters that includes the device, and determining the trust score of the device from the one trust score that is mapped to the one device cluster.

12. The method of claim 11, further comprising:

determining whether the plurality of device clusters is greater than a threshold; and responsive to determining that the plurality of device clusters is greater than the threshold, re-determining, with the trust model, a second plurality of device clusters based on the population of device attributes, and the each of the plurality of device clusters is mapped to the one trust score of the plurality of trust scores, wherein the second plurality of device clusters is equal to or less than the threshold.

13. A non-transitory computer-readable medium comprising instructions that, when executed by an electronic processor, cause the electronic processor to perform a set of operations comprising:

receiving a trust score request of a device from a client server;

generating, with a trust model, a trust score of the device that is distinct from a risk factor, the trust score representing a predicted trust level of the device, and the risk factor representing a fraud risk level associated with the device based on one or more device behaviors; and outputting the trust score to the client server in satisfaction of the trust score request, wherein the trust score request includes information indicating device attributes associated with the device, and wherein the set of operations further includes determining whether the device attributes are sufficient for generating the trust score of the device;

outputting a null trust score to the client server in satisfaction of the trust score request in response to determining that the device attributes are not sufficient for generating the trust score of the device; and outputting the trust score to the client server in satisfaction of the trust score request and in response to determining that the device attributes are sufficient for generating the trust score of the device.

14. The non-transitory computer-readable medium of claim 13, wherein the set of operations further includes determining whether the device has a pre-existing trust score;

retrieving the pre-existing trust score from a database in response to determining that the device has the pre-existing trust score;

outputting the pre-existing trust score to the client server in satisfaction of the trust score request in response to retrieving the pre-existing trust score; and outputting a null pre-existing trust score to the client server in satisfaction of the trust score request in response to determining that the device does not have the pre-existing trust score.

15. The non-transitory computer-readable medium of claim 13, wherein determining whether the device attributes are sufficient for generating the trust score of the device further includes determining whether the device attributes are sufficient for generating the trust score of the device without an IP address associated with the device.

16. The non-transitory computer-readable medium of claim 13, wherein the device attributes include a plugin attribute, a web graphics library (WebGL) attribute, a canvas attribute, a screen resolution attribute, a time zone attribute, a language attribute, a local storage attribute, a cookies attribute, and a device type attribute.

17. The non-transitory computer-readable medium of claim 13, wherein the trust score request includes information indicating device attributes associated with the device, and wherein generating, with the trust model, the trust score of the device further includes determining, with the trust model, a plurality of device clusters based on a population of device attributes, the population of device attributes including the device attributes associated with the device and a plurality of device attributes associated with other devices, and each of the plurality of device clusters is mapped to one trust score of a plurality of trust scores, determining one device cluster of the plurality of device clusters that includes the device, and determining the trust score of the device from the one trust score that is mapped to the one device cluster.

* * * * *